US011085469B2

(12) United States Patent
Tomac et al.

(10) Patent No.: US 11,085,469 B2
(45) Date of Patent: Aug. 10, 2021

(54) FREQUENCY-SYNCHRONIZED FLUIDIC OSCILLATOR ARRAY

(71) Applicant: Ohio State Innovation Foundation, Columbus, OH (US)

(72) Inventors: Mehmet Tomac, Cincinnati, OH (US); James Gregory, Columbus, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 148 days.

(21) Appl. No.: 16/157,460

(22) Filed: Oct. 11, 2018

(65) Prior Publication Data

US 2019/0145441 A1 May 16, 2019

Related U.S. Application Data

(60) Provisional application No. 62/570,714, filed on Oct. 11, 2017.

(51) Int. Cl.

| | |
|---|---|
| ***F16K 1/22*** | (2006.01) |
| ***F15C 1/22*** | (2006.01) |
| ***B05B 1/08*** | (2006.01) |

(52) U.S. Cl.

CPC .................. *F15C 1/22* (2013.01); *B05B 1/08* (2013.01); *Y10T 137/212* (2015.04);

(Continued)

(58) Field of Classification Search

CPC .......... F15C 1/22; B05B 1/08; Y10T 137/212; Y10T 137/2185; Y10T 137/2224;

(Continued)

(56) References Cited

U.S. PATENT DOCUMENTS 3,117,593 A * 1/1964 Sowers, III ............... F15C 1/08 235/201 PF
3,228,410 A * 1/1966 Warren ..................... F15C 1/22 137/818

(Continued)

FOREIGN PATENT DOCUMENTS

WO 2018197231 A1 11/2018

OTHER PUBLICATIONS

Gokoglu, S. A., Kuczmarski, M. A., Gulley, D. E., and Raghu, S., 2011, “Numerical studies of an array of fluidic diverter actuators for flow control,” AIAA-2011-3100, Proceedings of the 41st AIAA Fluid Dynamics Conference and Exhibit, Honolulu, HI.

(Continued)

*Primary Examiner* — Minh Q Le
(74) *Attorney, Agent, or Firm* — Meunier Carlin & Curfman LLC

(57) ABSTRACT

Various implementations include a fluidic oscillator array including at least two fluidic oscillators, each including an interaction chamber, fluid supply inlet, outlet nozzle, and feedback channels. The interaction chambers have a first and second attachment wall. Fluid streams flow from the fluid supply inlets, into the interaction chambers, and exit through the outlet nozzles. A feedback channel is coupled to each of the first and second attachment walls. Each feedback channel is in fluid communication with the interaction chamber and has an intermediate portion disposed between a first and second end of the feedback channels. Fluid from the fluid stream flows into the first ends of the respective feedback channels, causing the fluid stream to oscillate between the first and second attachment walls. Adjacent feedback channels of adjacent fluidic oscillators share a common intermediate portion, causing the exiting fluid streams of each fluidic oscillator to oscillate at the same frequency.

16 Claims, 24 Drawing Sheets

(52) U.S. Cl.
CPC .... *Y10T 137/2185* (2015.04); *Y10T 137/2229* (2015.04); *Y10T 137/2234* (2015.04); *Y10T 137/2251* (2015.04)

(58) Field of Classification Search
CPC ......... Y10T 137/2229; Y10T 137/2234; Y10T 137/2267; Y10T 137/2251
USPC ........ 137/814, 826, 833, 834, 835, 841, 838
See application file for complete search history.

(56) References Cited

U.S. PATENT DOCUMENTS

| | | | | |
|---|---|---|---|---|
| 3,605,778 | A * | 9/1971 | Metzger | F15C 1/005 137/804 |
| 3,614,964 | A * | 10/1971 | Chen | F15C 1/10 137/815 |
| 4,463,904 | A | 8/1984 | Bray, Jr. | |
| 4,508,267 | A | 4/1985 | Stouffer | |
| 5,524,660 | A * | 6/1996 | Dugan | B01F 3/04049 137/14 |
| 5,827,976 | A * | 10/1998 | Stouffer | F15C 1/005 73/861.19 |
| 5,845,845 | A * | 12/1998 | Merke | B05B 1/08 239/1 |
| 7,128,082 | B1 | 10/2006 | Cerretelli et al. | |
| 8,382,043 | B1 * | 2/2013 | Raghu | B64C 21/04 244/1 N |
| 9,333,517 | B2 | 5/2016 | Koklu | |
| 9,802,209 | B2 * | 10/2017 | Koklu | F15D 1/009 |
| 10,429,138 | B2 * | 10/2019 | Gissen | F28F 13/12 |
| 2008/0149205 | A1 * | 6/2008 | Gupta | F02K 3/00 137/829 |
| 2010/0123031 | A1 * | 5/2010 | Weber | F15C 1/08 239/589.1 |
| 2017/0326560 | A1 * | 11/2017 | Kanda | B05B 1/10 |

OTHER PUBLICATIONS

Shigeta, M., Miura, T., Izawa, S., and Fukunishi, Y., 2009, "Active Control of Cavity Noise by Fluidic Oscillators," Theoretical and Applied Mechanics Japan, vol. 57, pp. 127-134.

Tesař, V., Zhong, S., and Rasheed, F., 2013, "New Fluidic-Oscillator Concept for Flow-Separation Control," AIAA Journal, vol. 51, No. 2, pp. 397-405.

* cited by examiner

| LABEL | DIMENSION (MM) |
|---|---|
| A | 25.35 |
| B | 3.27 |
| C | 4.03 |
| D | 4.03 |
| E | 3.5 |
| F | 20.16 |

FREQUENCY-SYNCHRONIZED FLUIDIC OSCILLATOR ARRAY

CROSS REFERENCE TO RELATED APPLICATIONS

This application claims the benefit of U.S. Provisional Patent Application No. 62/570,714, filed Oct. 11, 2017, the content of which is incorporated herein by reference in its entirety.

BACKGROUND

Fluidic oscillators create an unsteady oscillating jet with a frequency that depends primarily on the internal fluid dynamics of the oscillator itself. Fluidic oscillators are attracting increased interest to be used in various applications since they have no moving parts, yet they offer high control authority, oscillation over a wide range of operating frequencies, and, due to its unique fluid distribution system, larger sweeping area capabilities for the same amount of fluid.

In various applications, one fluidic oscillator is not enough to create the desired outcome. Consider a flow control case such as flow over a wing for instance, since the wing is too big and/or long to control the flow over it with one fluidic oscillator, more than one fluidic oscillator is required. But when a number of fluidic oscillators are used they oscillate randomly. Since fluidic oscillators act as vortex generators for flow over a wing, synchronization of the oscillators will also synchronize the vortex generation.

Currently, fluidic oscillators are mostly in use as windshield washer fluid nozzles in vehicles and as spray devices for various spray applications. The fluidic oscillator represents a useful device for a variety of different engineering applications because it has variable frequency, it has an unsteady oscillating jet, its jet spreads more, its wide range of dynamic pressures, its design is simple, it has an almost maintenance-free design, and it has no moving parts.

There is an increasing interest in fluidic oscillators for use in various flow control applications for manipulating the flow field to obtain a desired outcome. Recent flow control applications of the fluidic oscillator have mostly relied upon the time-averaged injected momentum to achieve the desired benefit (e.g., separation control). For example, prior attempts used arrays of fluidic oscillators (also referred to as sweeping jets) for separation control across a large span. These experiments, which have ranged from small-scale wind tunnel studies to large-scale flight test, would benefit from an array of fluidic oscillators to achieve the control benefit. In these situations, the instantaneous jet position (relative phase) between adjacent individual oscillators may determine whether there is mutual interference between oscillators that could limit control authority. Furthermore, recent studies of single oscillators in other configurations have shown that production of streamwise vorticity by the sweeping jet is a promising control approach. In an array of individual fluidic oscillators acting as unsteady vortex-generating jets, there is no control of the phasing between adjacent actuators, and thus, adjacent regions of streamwise vorticity may interact in a destructive manner if vorticity production is not synchronized.

Thus, there is a desire for phase control and synchronization of fluidic oscillators configured in an array.

SUMMARY

Various implementations include a fluidic oscillator array including at least two fluidic oscillators. For example, in various implementations, each of the at least two fluidic oscillators includes an interaction chamber, a fluid supply inlet, an outlet nozzle, and feedback channels. The interaction chamber of each of the two fluidic oscillators has a first attachment wall and a second attachment wall that is opposite and spaced apart from the first attachment wall. The fluid supply inlet of each of the two fluidic oscillators introduces a fluid stream into the interaction chamber. The outlet nozzle of each of the two fluidic oscillators is downstream of the fluid supply inlet, and the fluid stream exits the interaction chamber through the outlet nozzle. A feedback channel is coupled to each of the first attachment wall and second attachment wall of each of the two fluidic oscillators. Each feedback channel is in fluid communication with the interaction chamber and has a first end, a second end that is opposite and spaced apart from the first end, and an intermediate portion disposed between the first end and second end. The first end is adjacent the outlet nozzle and the second end is adjacent the fluid supply inlet. The first attachment wall and second attachment wall of the interaction chamber are shaped to allow fluid from the fluid stream to flow into the first ends of the respective feedback channels, causing the fluid stream to oscillate between the first attachment wall and second attachment wall of the interaction chamber. Adjacent feedback channels of adjacent fluidic oscillators share a common intermediate portion such that the adjacent feedback channels are in fluid communication with each other, causing the fluid streams exiting the outlet nozzles of each of the at least two fluidic oscillators to oscillate at the same frequency.

In some implementations, the fluid from the fluid stream of one fluidic oscillator flows from the first end of one of the feedback channels of the one fluidic oscillator and through the first end of one of the feedback channels of an adjacent fluidic oscillator.

In some implementations, the fluid streams exiting the outlet nozzles of at least two fluidic oscillators oscillate in phase with each other. In some implementations, the fluid streams exiting the outlet nozzles of the at least two fluidic oscillators oscillate with a 180 degree phase difference.

In some implementations, adjacent fluidic oscillators share common intermediate portions of two feedback channels such that the two feedback channels are in fluid communication with each other.

In some implementations, at least two fluidic oscillators include a central axis extending from the fluid supply inlet to the outlet nozzle, and the central axes of the at least two fluidic oscillators are parallel to each other. In some implementations, at least two fluidic oscillators include a central axis extending from the fluid supply inlet to the outlet nozzle, and the central axes of the at least two of the fluidic oscillators are coincident with each other. In some implementations, at least two fluidic oscillators include a central axis extending from the fluid supply inlet to the outlet nozzle, and the central axes of the at least two of the fluidic oscillators are perpendicular to each other.

In some implementations, at least two fluidic oscillators include an interaction chamber plane extending between the first attachment wall and the second attachment wall, and the interaction chamber plane of the at least two of the fluidic oscillators are parallel with each other. In some implementations, at least two fluidic oscillators include an interaction chamber plane extending between the first attachment wall and the second attachment wall of at least two fluidic oscillators, and the interaction chamber plane of at least two of the fluidic oscillators are perpendicular to each other.

Various other implementations include a fluidic oscillator array including a first fluidic oscillator and a second fluidic oscillator. For example, in various implementations, each of the first fluidic oscillator and second fluidic oscillator include an interaction chamber, a fluid supply inlet, an outlet nozzle, a first feedback channel, and a second feedback channel. The interaction chamber of each of the first fluidic oscillator and second fluidic oscillator has a first attachment wall and a second attachment wall that is opposite and spaced apart from the first attachment wall. The fluid supply inlet of each of the first fluidic oscillator and second fluidic oscillator introduces a fluid stream into the interaction chamber. The outlet nozzle of each of the first fluidic oscillator and second fluidic oscillator is downstream of the fluid supply inlet, and the fluid stream exits the interaction chamber through the outlet nozzle of each of the first fluidic oscillator and second fluidic oscillator. The first feedback channel is coupled to the first attachment wall of each of the first fluidic oscillator and second fluidic oscillator and a second feedback channel is coupled to the second attachment wall of each of the first fluidic oscillator and second fluidic oscillator. The first feedback channel and second feedback channel of each of the first fluidic oscillator and second fluidic oscillator are in fluid communication with the respective interaction chamber, and each of the first feedback channel and second feedback channel has a first end, a second end opposite and spaced apart from the first end, and an intermediate portion disposed between the first end and second end. The first end is adjacent the outlet nozzle and the second end is adjacent the fluid supply inlet. The first attachment wall and second attachment wall of the interaction chamber of each of the first fluidic oscillator and second fluidic oscillator are shaped to allow fluid from the fluid stream to flow into the first ends of the first feedback channel and second feedback channel of each of the first fluidic oscillator and second fluidic oscillator, respectively, causing the fluid stream to oscillate between the first attachment wall and second attachment wall of the interaction chamber of each of the first fluidic oscillator and second fluidic oscillator. The first feedback channel of the first fluidic oscillator and the second feedback channel of the second fluidic oscillator share a common intermediate portion such that the adjacent feedback channels are in fluid communication with each other, causing the fluid streams exiting the outlet nozzles of the first fluidic oscillator and second fluidic oscillator to oscillate at the same frequency.

In some implementations, the fluid from the fluid stream of the first fluidic oscillator flows from the first end of the first feedback channel of the first fluidic oscillator and through the first end of the second feedback channel of the second fluidic oscillator.

In some implementations, the fluid streams exiting the outlet nozzles of the first fluidic oscillator and the second fluidic oscillator oscillate in phase with each other. In some implementations, the fluid streams exiting the outlet nozzles of the first fluidic oscillator and the second fluidic oscillator oscillate with a 180 degree phase difference.

In some implementations, the second feedback channel of the first fluidic oscillator and the first feedback channel of the second fluidic oscillator share a common intermediate portion such that the second feedback channel of the first fluidic oscillator and the first feedback channel of the second fluidic oscillator are in fluid communication with each other.

In some implementations, both the first fluidic oscillator and the second fluidic oscillator include a central axis extending from the fluid supply inlet to the outlet nozzle, and the central axis of the first fluidic oscillator and the central axis of the second fluidic oscillator are parallel to each other. In some implementations, both the first fluidic oscillator and the second fluidic oscillator include a central axis extending from the fluid supply inlet to the outlet nozzle, and the central axis of the first fluidic oscillator and the central axis of the second fluidic oscillator are coincident with each other. In some implementations, both the first fluidic oscillator and the second fluidic oscillator include a central axis extending from the fluid supply inlet to the outlet nozzle, and the central axis of the first fluidic oscillator and the central axis of the second fluidic oscillator are perpendicular to each other.

In some implementations, both the first fluidic oscillator and the second fluidic oscillator include an interaction chamber plane extending between the first attachment wall and the second attachment wall, and the interaction chamber plane of the first fluidic oscillator and the interaction chamber plane of the second fluidic oscillator are parallel with each other. In some implementations, both the first fluidic oscillator and the second fluidic oscillator include an interaction chamber plane extending between the first attachment wall and the second attachment wall, and the interaction chamber plane of the first fluidic oscillator and the interaction chamber plane of the second fluidic oscillator are perpendicular to each other.

BRIEF DESCRIPTION OF DRAWINGS

Example features and implementations are disclosed in the accompanying drawings. However, the present disclosure is not limited to the precise arrangements and instrumentalities shown. Similar elements in different implementations are designated using the same reference numerals.

DETAILED DESCRIPTION

Figure 1A:
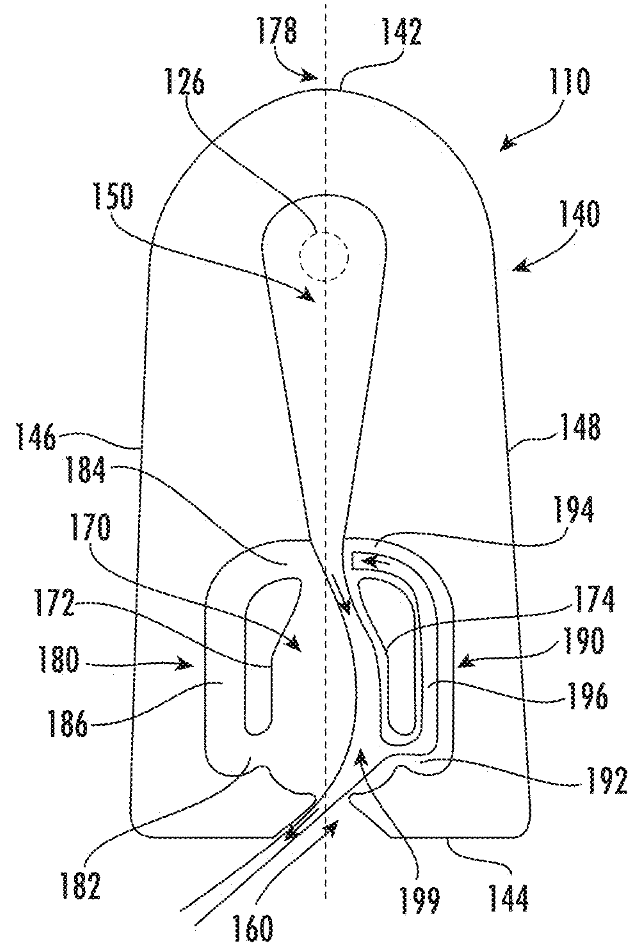
FIG. 1A (PRIOR ART)
FIG. 1A is a top view of a single feedback-type fluidic oscillator of the prior art.

Various implementations include a fluidic oscillator array including at least two fluidic oscillators. Each of the at least two fluidic oscillators includes an interaction chamber, a fluid supply inlet, an outlet nozzle, and feedback channels. The interaction chamber of each of the two fluidic oscillators has a first attachment wall and a second attachment wall that is opposite and spaced apart from the first attachment wall. The fluid supply inlet of each of the two fluidic oscillators introduces a fluid stream into the interaction chamber. The outlet nozzle of each of the two fluidic oscillators is downstream of the fluid supply inlet, and the fluid stream exits the interaction chamber through the outlet nozzle. A feedback channel is coupled to each of the first attachment wall and second attachment wall of each of the two fluidic oscillators. Each feedback channel is in fluid communication with the interaction chamber and has a first end, a second end that is opposite and spaced apart from the first end, and an intermediate portion disposed between the first end and second end. The first end is adjacent the outlet nozzle and the second end is adjacent the fluid supply inlet. The first attachment wall and second attachment wall of the interaction chamber are shaped to allow fluid from the fluid stream to flow into the first ends of the respective feedback channels, causing the fluid stream to oscillate between the first attachment wall and second attachment wall of the interaction chamber. Adjacent feedback channels of adjacent fluidic oscillators share a common intermediate portion such that the adjacent feedback channels are in fluid communication with each other, causing the fluid streams exiting the outlet nozzles of each of the at least two fluidic oscillators to oscillate at the same frequency.

Various other implementations include a fluidic oscillator array including a first fluidic oscillator and a second fluidic oscillator. Each of the first fluidic oscillator and second fluidic oscillator include an interaction chamber, a fluid supply inlet, an outlet nozzle, a first feedback channel, and a second feedback channel. The interaction chamber of each of the first fluidic oscillator and second fluidic oscillator has a first attachment wall and a second attachment wall that is opposite and spaced apart from the first attachment wall. The fluid supply inlet of each of the first fluidic oscillator and second fluidic oscillator introduces a fluid stream into the interaction chamber. The outlet nozzle of each of the first fluidic oscillator and second fluidic oscillator is downstream of the fluid supply inlet, and the fluid stream exits the interaction chamber through the outlet nozzle of each of the first fluidic oscillator and second fluidic oscillator. The first feedback channel is coupled to the first attachment wall of each of the first fluidic oscillator and second fluidic oscillator and a second feedback channel is coupled to the second attachment wall of each of the first fluidic oscillator and second fluidic oscillator. The first feedback channel and second feedback channel of each of the first fluidic oscillator and second fluidic oscillator are in fluid communication with the respective interaction chamber, and each of the first feedback channel and second feedback channel has a first end, a second end opposite and spaced apart from the first end, and an intermediate portion disposed between the first end and second end. The first end is adjacent the outlet nozzle and the second end is adjacent the fluid supply inlet. The first attachment wall and second attachment wall of the interaction chamber of each of the first fluidic oscillator and second fluidic oscillator are shaped to allow fluid from the fluid stream to flow into the first ends of the first feedback channel and second feedback channel of each of the first fluidic oscillator and second fluidic oscillator, respectively, causing the fluid stream to oscillate between the first attachment wall and second attachment wall of the interaction chamber of each of the first fluidic oscillator and second fluidic oscillator. The first feedback channel of the first fluidic oscillator and the second feedback channel of the second fluidic oscillator share a common intermediate portion such that the adjacent feedback channels are in fluid communication with each other, causing the fluid streams exiting the outlet nozzles of the first fluidic oscillator and second fluidic oscillator to oscillate at the same frequency.

The ability to synchronize the oscillation of an array of fluidic oscillators is correlated with the level of understanding of the internal operation of a single fluidic oscillator. For an array of fluidic oscillators acting as unsteady vortex-generating jets, it is beneficial to carefully control the phasing between adjacent actuators, since adjacent regions of streamwise vorticity may interact in a destructive manner if vorticity production is not synchronized. When the fluidic oscillators are not synchronized they randomly generate vortices and there is no order to this generation. These fluidic oscillators generated vortices most likely to interact each other and will diminish the efficiency of the flow control.

Figure 1B:
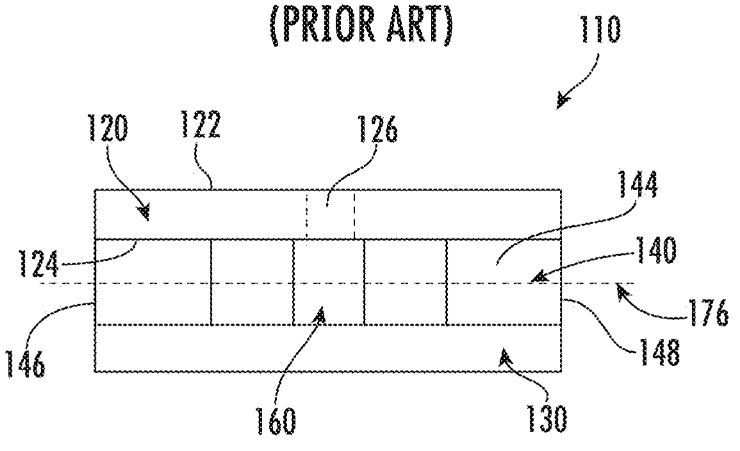
FIG. 1B (PRIOR ART)
FIG. 1B is an end view of the single feedback-type fluidic oscillator of FIG. 1A.

FIG. 1A shows a top view of a single fluidic oscillator 110, and FIG. 1B shows an end view of the single fluidic oscillator 110 as viewed from the second end 144 of the middle portion 140. The fluidic oscillator 110 includes a first portion 120, a second portion 130, and a middle portion 140 disposed between the first portion 120 and the second portion 130. The middle portion 140 has a first end 142 and a second end 144 opposite and spaced apart from the first end 142, and a first side 146 and a second side 148 opposite and spaced apart from the first side 146. The middle portion 140 is structured such that, when the middle portion 140 is disposed between the first portion 120 and the second portion 130, openings are defined by the walls of the middle portion 140. The openings in the middle portion 140 of the fluidic oscillator 110 include an interaction chamber 170, a fluid supply inlet 150, an outlet nozzle 160, a first feedback channel 190, and a second feedback channel 180. The idle portion 140 of the fluidic oscillator 110 also includes a central axis 178 extending between the fluid supply inlet 150 and the outlet nozzle 160.

The first portion 120 of the fluidic oscillator 110 has a first side 122 and a second side 124 opposite and spaced apart from the first side 122, and the first portion 120 defines an inlet port 126 extending from the first side 122 of the first portion 120 to the second side 124 of the first portion 120. The fluid supply inlet 150 of the middle portion 140 is located adjacent the first end 142 of the middle portion 140, and the inlet port 126 is aligned with the fluid supply inlet 150 such that the inlet port 126 and the fluid supply inlet 150 are in fluid communication with each other.

The outlet nozzle 160 is located adjacent the second end 144 of the middle portion 140, downstream of the fluid supply inlet 150, as discussed below. The outlet nozzle 160 extends from the second end 144 of the middle portion 140 toward the first end 142 of the middle portion 140.

The interaction chamber 170 is located between, and is in fluid communication with, the fluid supply inlet 150 and the outlet nozzle 160. The interaction chamber 170 has a first attachment wall 172 and a second attachment wall 174 that is opposite and spaced apart from the first attachment wall 172. The interaction chamber 170 also has an interaction chamber plane 170 extending between the first attachment wall 172 and the second attachment wall 174 and parallel to the first side 146 of the middle portion 140. The first attachment wall 172 and second attachment wall 174 mirror each other across a plane intersecting the central axis 178 and perpendicular to the interaction chamber plane 170. Each attachment wall 172, 174 has a curvature such that the first attachment wall 172 and second attachment wall 174 are closer to each other adjacent the fluid supply inlet 150 than adjacent the outlet nozzle 160.

The first feedback channel 190 and the second feedback channel 180 each have a first end 192, 182, a second end 194, 184 opposite and spaced apart from the first end 192, 182, and an intermediate portion 196, 186 disposed between the first end 192, 182 and second end 194, 184. The first feedback channel 190 is coupled to the first attachment wall 172 and the second feedback channel 180 is coupled to the second attachment wall 174 such that both the first feedback channel 190 and the second feedback channel 180 are in fluid communication with the interaction chamber 170. The first end 192, 182 of both feedback channels 190, 180 is adjacent the outlet nozzle 160 such that the first ends 192, 182 of the feedback channels 190, 180 are closer than the second ends 194, 184 of the feedback channels 190, 180 to the outlet nozzle 160. The second end 194, 184 of both feedback channels 190, 180 is adjacent the fluid supply inlet 150 such that the second ends 194, 184 of the feedback channels 190, 180 are closer than the first ends 192, 182 of the feedback channels 190, 180 to the fluid supply inlet 150.

A fluid stream 199 enters the fluidic oscillator 110 through the inlet port 126 and flows through the fluid supply inlet 150, through the interaction chamber 170, and exits the fluidic oscillator 110 through the outlet nozzle 160. The first attachment wall 172 and second attachment wall 174 of the interaction chamber 170 are a predetermined distance from each other such that, as the fluid stream 199 flows through the interaction chamber 170, a pressure difference across the fluid stream 199 causes the fluid stream 199 to deflect toward, and eventually attach to, either the first attachment wall 172 or the second attachment wall 174 due to the Coanda effect. The first attachment wall 172 and second attachment wall 174 of the interaction chamber 170 are shaped to allow fluid from the fluid stream 199 to flow into the first ends 192, 182 of the first feedback channel 190 and second feedback channel 180, respectively, when the fluid stream 199 is attached to that attachment wall 172, 174. The fluid stream 199 can include any fluid, for example, any liquid or gas.

When the fluid stream 199 is attached to the first attachment wall 172, fluid from the fluid stream 199 enters the first end 192 of the first feedback channel 190, flows through the intermediate portion 196 of the first feedback channel 190 and out of the second end 194 of the first feedback channel 190. The fluid exiting the second end 194 of the first feedback channel 190 contacts the fluid stream 199 adjacent the fluid supply inlet 150, causing the fluid stream 199 to detach from the first attachment wall 172 and attach to the second attachment wall 174. Fluid from the fluid stream 199 then enters the first end 182 of the second feedback channel 180, flows through the intermediate portion 186 of the second feedback channel 180 and out of the second end 184 of the second feedback channel 180. The fluid exiting the second end 184 of the second feedback channel 180 contacts the fluid stream 199 adjacent the fluid supply inlet 150, causing the fluid stream 199 to detach from the second attachment wall 174 and attach back to the first attachment wall 172. The fluid stream 199 continues to oscillate between attachment to the first attachment wall 172 and second attachment wall 174 of the interaction chamber 170.

Because of the shape of the outlet nozzle 160 and the curvature of the first attachment wall 172 and second attachment wall 174, the oscillation of the fluid stream 199 between the first attachment wall 172 and the second attachment wall 174 causes the fluid stream 199 to oscillate as the fluid stream 199 exits the fluidic oscillator 110 through the outlet nozzle 160.

Figure 2:
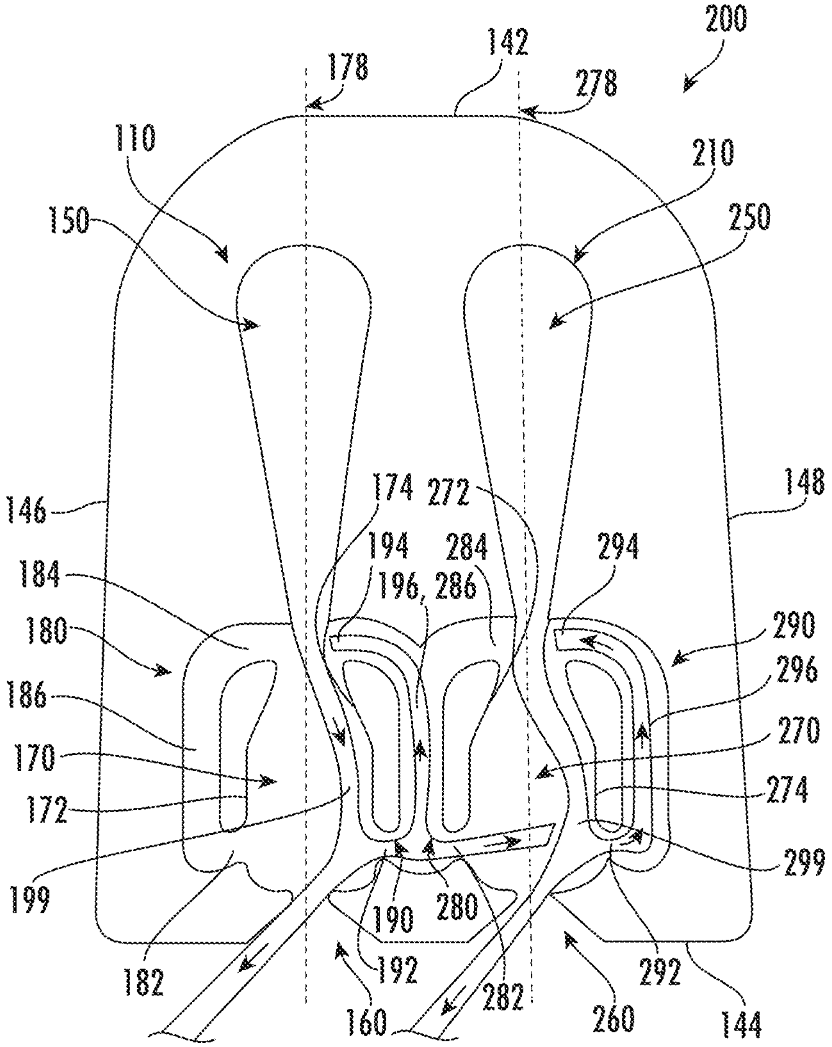
FIG. 2 is a top view of an array of two feedback-type fluidic oscillators, according to one implementation.

FIG. 2 shows a fluidic oscillator array 200 according to one implementation of the current application. The fluidic oscillator array 200 includes a first fluidic oscillator 110 and a second fluidic oscillator 210 adjacent each other such that their respective central axes 178, 278 are parallel to each other. Both the first fluidic oscillator 110 and the second fluidic oscillator 210 are similar to the fluidic oscillator 110 shown in FIG. 1, and thus, features of fluidic oscillators 110, 210 are indicated using similar reference numbers. However, in the fluidic oscillator array 200 of FIG. 2, the first feedback channel 190 of the first fluidic oscillator 110 and the second feedback channel 280 of the second fluidic oscillator 210 share a common intermediate portion 196, 286 such that the adjacent feedback channels 190, 280 are in fluid communication with each other.

When the fluid stream 199 in the first fluidic oscillator 110 attaches to the first attachment wall 172 such that fluid from the fluid stream 199 flows into the first end 192 of the first feedback channel 190, a portion of the fluid flows through the first end 282 of the second feedback channel 280 of the second fluidic oscillator 210 and into the interaction chamber 270 of the second fluidic oscillator 210. The portion of fluid from the first fluidic oscillator 110 contacts the fluid stream 299 of the second fluidic oscillator 210, causing the fluid stream 299 of the second fluidic oscillator 210 to curve toward, and attach to, the first attachment wall 272 of the second fluidic oscillator 210. Thus, the fluid streams 199, 299 in both the first fluidic oscillator 110 and the second fluidic oscillator 210 are attached to their respective first attachment walls 172, 272.

Similarly, when the fluid stream 299 in the second fluidic oscillator 210 attaches to the second attachment wall 274 such that fluid from the fluid stream 299 flows into the first end 282 of the second feedback channel 280, a portion of the fluid flows through the first end 192 of the first feedback channel 190 of the first fluidic oscillator 110 and into the interaction chamber 170 of the first fluidic oscillator 110. The portion of fluid from the second fluidic oscillator 210 contacts the fluid stream 199 of the first fluidic oscillator 110, causing the fluid stream 199 of the first fluidic oscillator 110 to curve toward, and attach to, the second attachment wall 174 of the first fluidic oscillator 110. Thus, the fluid streams 199, 299 in both the first fluidic oscillator 110 and the second fluidic oscillator 210 are attached to their respective second attachment walls 174, 274.

Because the attachment of the fluid stream 199, 299 to an attachment wall 172, 174, 272, 274 of one of the fluidic oscillators 110, 210 in the fluidic oscillator array 200 affects the timing of the attachment of the fluid stream 199, 299 to the attachment wall 172, 174, 272, 274 in the other fluidic oscillator 110, 210, the fluid streams 199, 299 inside the interaction chambers 170, 270 oscillate at the same frequency. Because the fluid streams 199, 299 inside the interaction chambers 170, 270 of the fluidic oscillators 110, 210 oscillate at the same frequency, the fluid streams 199, 299 exiting the outlet nozzles 160, 260 of the first fluidic oscillator 110 and second fluidic oscillator 210 also oscillate at the same frequency.

In FIG. 2, the first fluidic oscillator 110 and the second fluidic oscillator 210 share a common intermediate portion 196, 286 of the first feedback channel 190 and the second feedback channel 280, respectively, as discussed above. Thus, the fluid streams 199, 299 exiting the outlet nozzles 160, 260 of the first fluidic oscillator 110 and the second fluidic oscillator 210 oscillate in phase with each other such that the wave form of the exiting fluid streams 199, 299 reach their same respective apices simultaneously.

Figure 3:
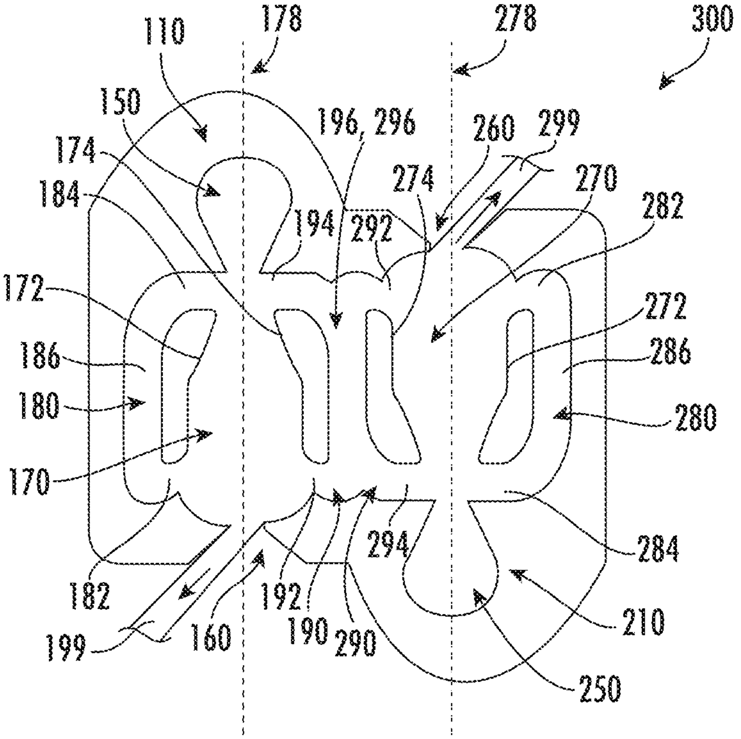
FIG. 3 is a top view of an array of two feedback-type fluidic oscillators, according to another implementation.

FIG. 3 shows another implementation of a fluidic oscillator array 300 including a first fluidic oscillator 110 and a second fluidic oscillator 210 similar to the fluidic oscillators 110, 210 shown in FIGS. 1 and 2. Although the central axis 178 of the first fluidic oscillator 110 and the central axis 278 of the second fluidic oscillator 210 are parallel to each other similar to the implementation shown in FIG. 2, the fluidic oscillators 110, 210 of the fluidic oscillator array 300 shown in FIG. 3 are oriented such that the outlet nozzles 160, 260 are pointing in opposite directions with respect to the general direction of fluid flow of the fluid streams 199, 299 of each fluidic oscillator 110, 210. Because of the opposite orientation of the first fluidic oscillator 110 and second fluidic oscillator 210, the first feedback channel 190 of the first fluidic oscillator 110 of the fluidic oscillator array 300 shown in FIG. 3 shares a common intermediate portion 196, 296 with the first feedback channel 290 of the second fluidic oscillator 210. Thus, the fluid streams 199, 299 exiting the outlet nozzles 160, 260 of the first fluidic oscillator 110 and the second fluidic oscillator 210 oscillate with a 180 degree phase difference such that the wave form of the exiting fluid streams 199, 299 reach their opposite respective apices simultaneously.

Figure 4:
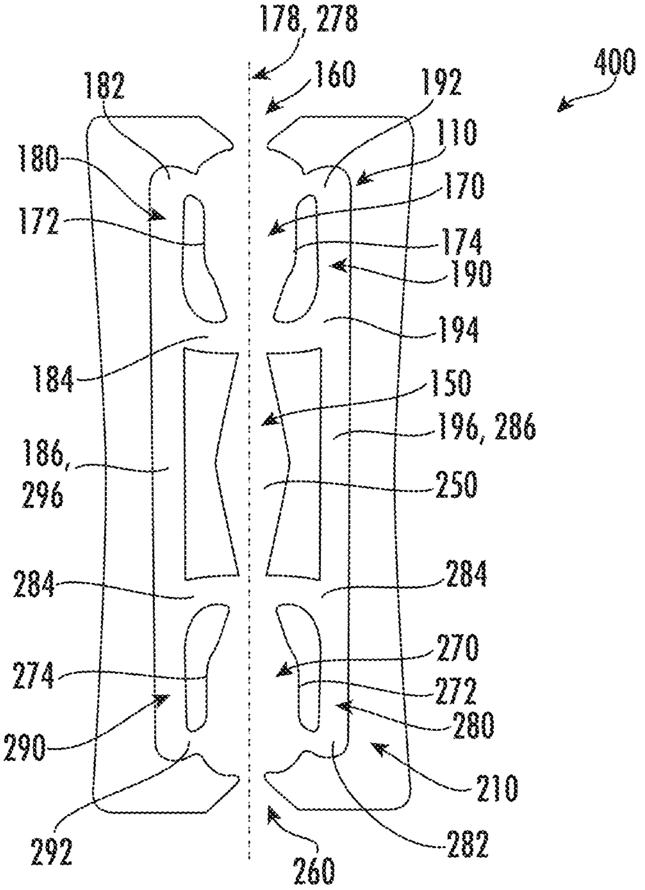
FIG. 4 is a top view of an array of two feedback-type fluidic oscillators, according to another implementation.

FIG. 4 shows another implementation of a fluidic oscillator array 400 including a first fluidic oscillator 110 and a second fluidic oscillator 210 similar to the fluidic oscillators 110, 210 shown in FIGS. 1-3. Similar to the implementation shown in FIG. 3, the fluidic oscillators 110, 210 of the fluidic oscillator array 400 shown in FIG. 4 are oriented such that the outlet nozzles 160, 260 are pointing in opposite directions with respect to the general direction of fluid flow of the fluid streams 199, 299 of each fluidic oscillator 110, 210. However, the central axes 178, 278 of the first fluidic oscillator 110 and second fluidic oscillator 210 in FIG. 4 are coincident with each other. Also, similar to the implementation shown in FIG. 2, the first feedback channel 190 of the first fluidic oscillator 110 shares a common intermediate portion 196, 286 with the second feedback channel 280 of the second fluidic oscillator 210. However, in the implementation shown in FIG. 4, the second feedback channel 180 of the first fluidic oscillator 110 also shares a common intermediate portion 186, 296 with the first feedback channel 290 of the second fluidic oscillator 210. Thus, the fluid streams 199, 299 exiting the outlet nozzles 160, 260 of the first fluidic oscillator 110 and the second fluidic oscillator 210 oscillate in phase with each other such that the wave form of the exiting fluid streams 199, 299 reach their same respective apices simultaneously.

Figure 5:
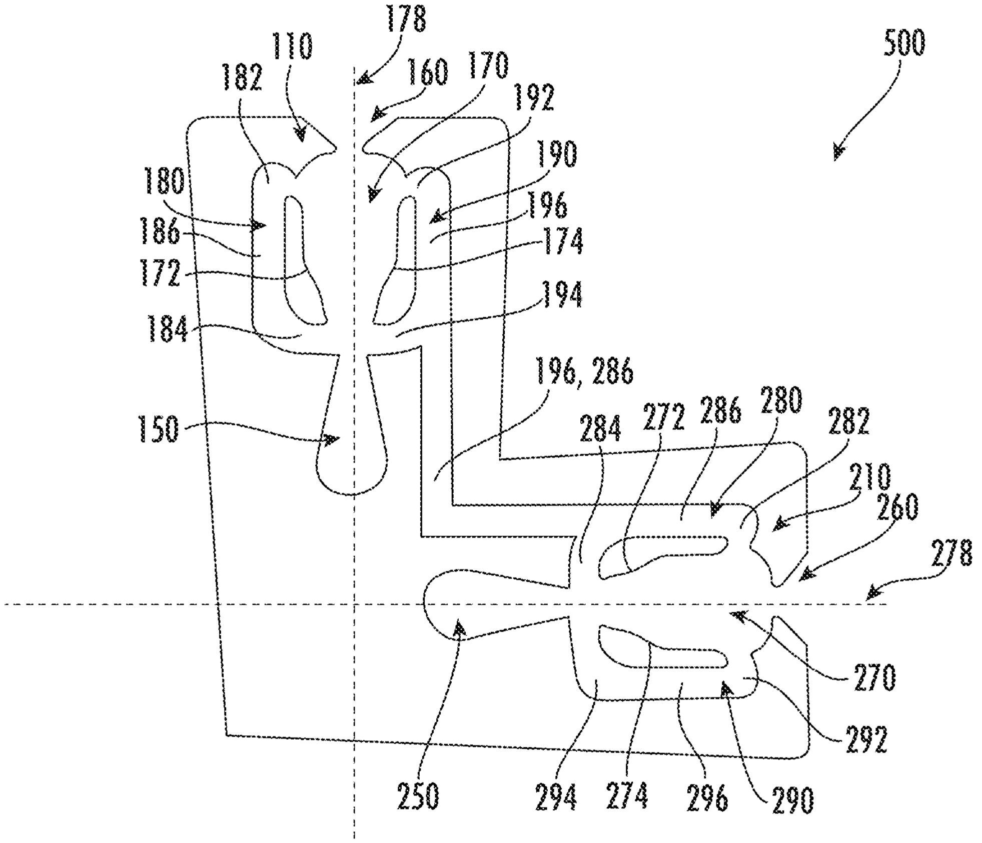
FIG. 5 is a top view of an array of two feedback-type fluidic oscillators, according to another implementation.

FIG. 5 shows another implementation of a fluidic oscillator array 500 including a first fluidic oscillator 110 and a second fluidic oscillator 210 similar to the fluidic oscillators 110, 210 shown in FIGS. 1-4. However, the central axes 178, 278 of the first fluidic oscillator 110 and second fluidic oscillator 210 in FIG. 5 are perpendicular to each other. Thus, the fluidic oscillators 110, 210 of the fluidic oscillator array 500 shown in FIG. 5 are oriented such that the outlet nozzles 160, 260 are pointing in directions perpendicular to each other with respect to the general direction of fluid flow of the fluid streams 199, 299 of each fluidic oscillator 110, 210. Similar to the implementation shown in FIG. 2, the first feedback channel 190 of the first fluidic oscillator 110 shares a common intermediate portion 196, 286 with the second feedback channel 280 of the second fluidic oscillator 210. Thus, the fluid streams 199, 299 exiting the outlet nozzles 160, 260 of the first fluidic oscillator 110 and the second fluidic oscillator 210 oscillate in phase with each other such that the wave form of the exiting fluid streams 199, 299 reach their same respective apices simultaneously.

Figure 6:
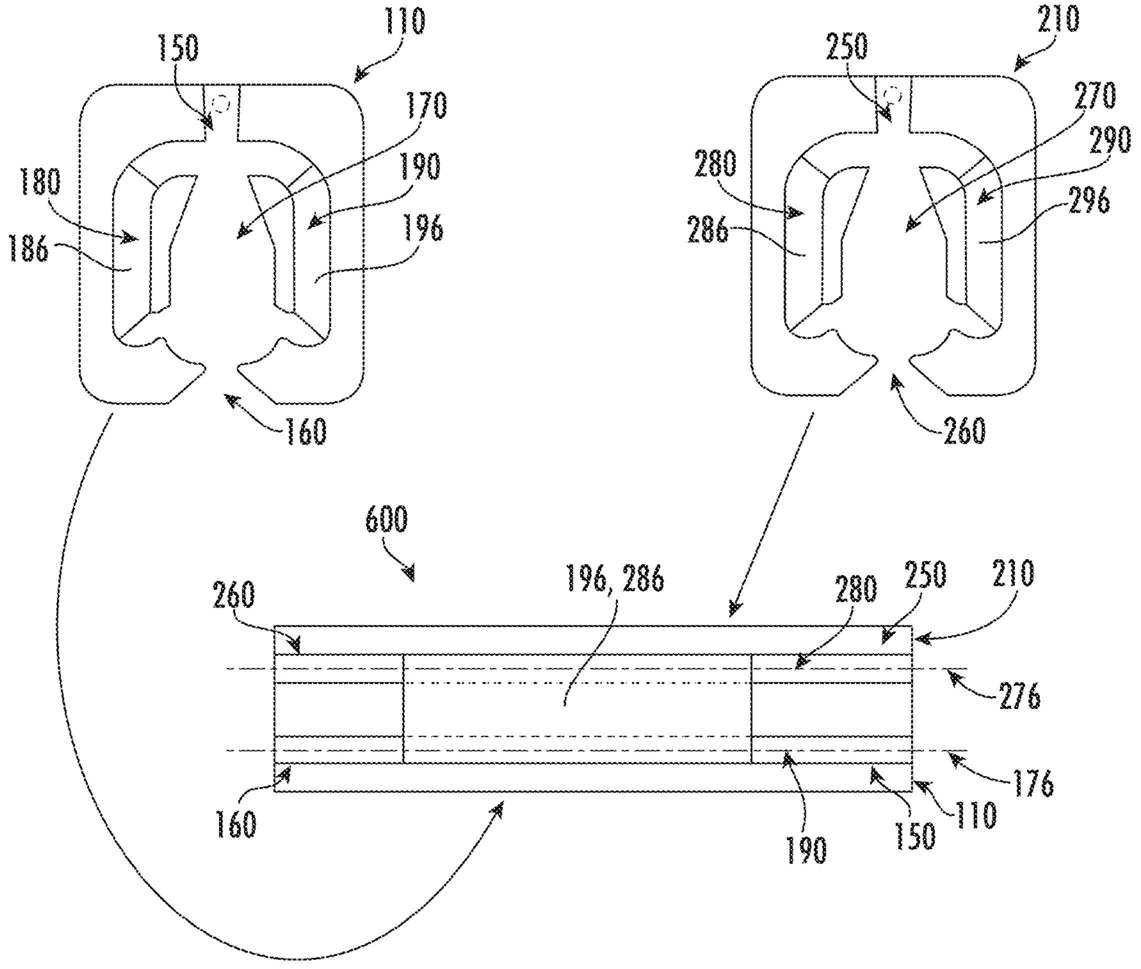
FIG. 6 is a schematic view of an array of two feedback-type fluidic oscillators, according to another implementation.

In each of the implementations shown in FIGS. 2-5, the interaction chamber plane 170 of the first fluidic oscillator 110 is parallel and overlapping with the interaction chamber plane 270 of the second fluidic oscillator 210. FIG. 6 shows another implementation of a fluidic oscillator array 600 including a first fluidic oscillator 110 and a second fluidic oscillator 210 similar to the fluidic oscillators 110, 210 shown in FIGS. 1-5. Although the interaction chamber plane 170 of the first fluidic oscillator 110 is parallel with the interaction chamber plane 270 of the second fluidic oscillator 210, the interaction chamber planes 170, 270 of the first fluidic oscillator 110 and the second fluidic oscillator 210 do not overlap. Rather, the central axis 178 of the first fluidic oscillator 110 and the central axis 278 of the second fluidic oscillator 210 are both disposed on a plane perpendicular to the interaction chamber planes 170, 270 of both fluidic oscillators 110, 210 such that the first portion 120 of the first fluidic oscillator 110 is adjacent the second portion 130 of the second fluidic oscillator 210. Similar to the implementation shown in FIG. 4, the first feedback channel 190 of the first fluidic oscillator 110 shares a common intermediate portion 196, 286 with the second feedback channel 280 of the second fluidic oscillator 210, and the second feedback channel 180 of the first fluidic oscillator 110 shares a common intermediate portion 186, 296 with the first feedback channel 290 of the second fluidic oscillator 210. Thus, the fluid streams 199, 299 exiting the outlet nozzles 160, 260 of the first fluidic oscillator 110 and the second fluidic oscillator 210 oscillate in phase with each other such that the wave form of the exiting fluid streams 199, 299 reach their same respective apices simultaneously.

Figure 7:
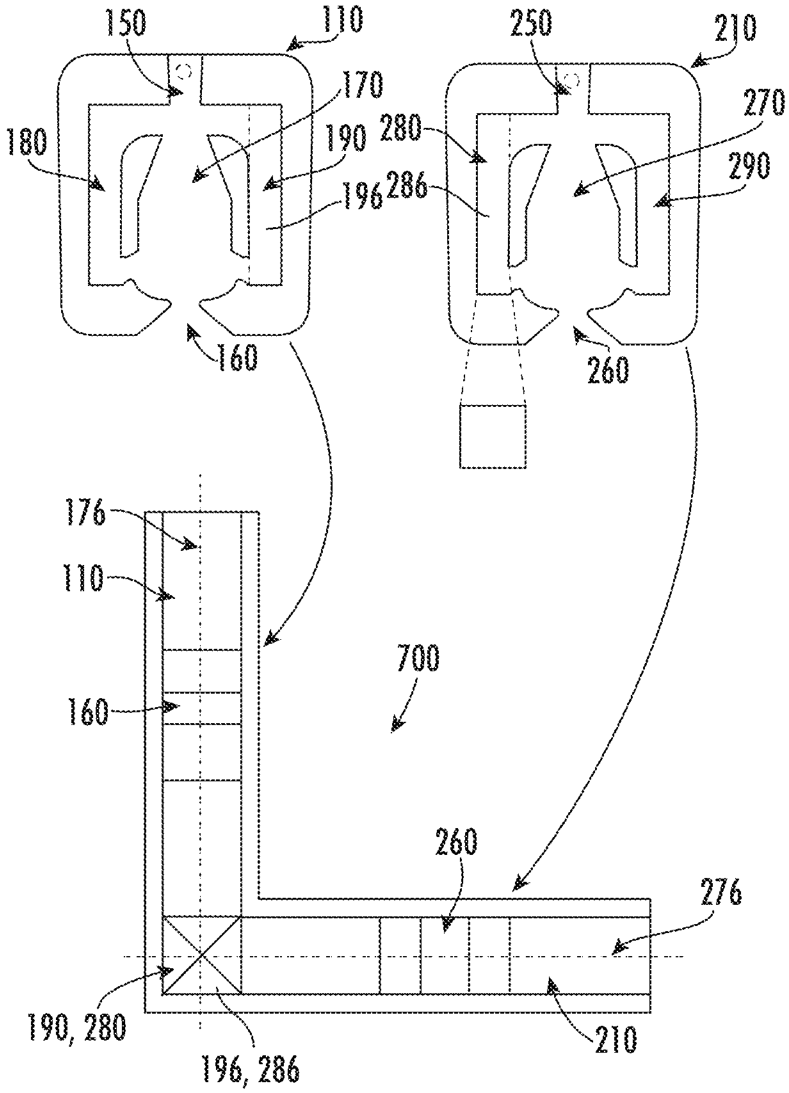
FIG. 7 is a schematic view of an array of two feedback-type fluidic oscillators, according to another implementation.

FIG. 7 shows another implementation of a fluidic oscillator array 700 including a first fluidic oscillator 110 and a second fluidic oscillator 210 similar to the fluidic oscillators 110, 210 shown in FIGS. 1-6. However, the interaction chamber plane 170 of the first fluidic oscillator 110 is perpendicular to the interaction chamber plane 270 of the second fluidic oscillator 210. Similar to the implementation shown in FIG. 2, the first feedback channel 190 of the first fluidic oscillator 110 shares a common intermediate portion 196, 286 with the second feedback channel 280 of the second fluidic oscillator 210. Thus, the fluid streams 199, 299 exiting the outlet nozzles 160, 260 of the first fluidic oscillator 110 and the second fluidic oscillator 210 oscillate in phase with each other such that the wave form of the exiting fluid streams 199, 299 reach their same respective apices simultaneously.

Figure 8:
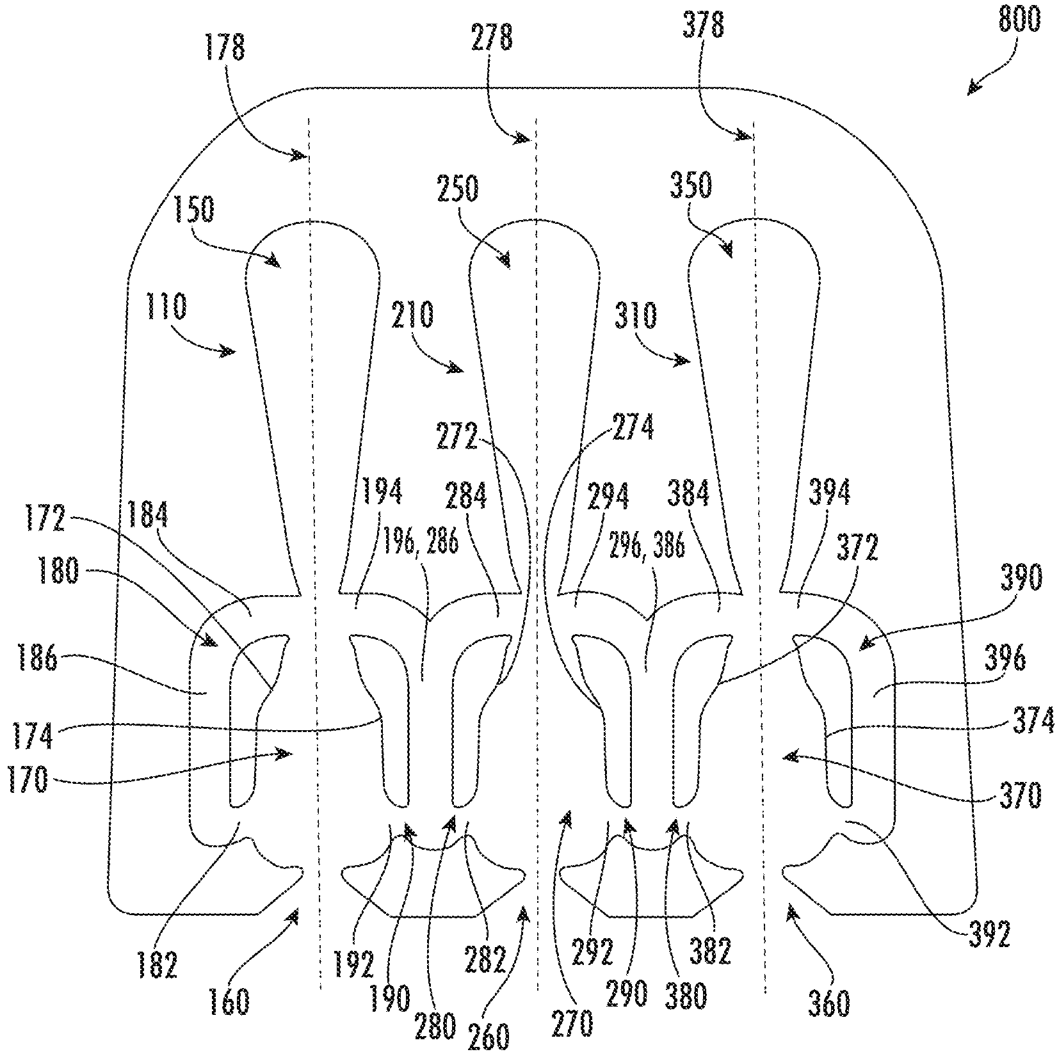
FIG. 8 is a top view of an array of three feedback-type fluidic oscillators, according to another implementation.

FIG. 8 shows another implementation of a fluidic oscillator array 800 including a first fluidic oscillator 110 and a second fluidic oscillator 210 similar to the fluidic oscillators shown in FIGS. 1-7, but also including a third fluidic oscillator 310. Adjacent feedback channels 190, 280, 290, 380 of each adjacent fluidic oscillator 110, 210, 310 in the implementation shown in FIG. 8 share a common intermediate portion 196, 286, 296, 386 such that the adjacent feedback channels 190, 280, 290, 380 are in fluid communication with each other. Thus, the first feedback channel 190 of the first fluidic oscillator 110 shares a common intermediate portion 196, 286 with the second feedback channel 280 of the second fluidic oscillator 210, and the first feedback channel 290 of the second fluidic oscillator 210 shares a common intermediate portion 296, 386 with the second feedback channel 380 of the third fluidic oscillator 310. Thus, the fluid streams 199, 299, 399 exiting the outlet nozzles 160, 260, 360 of the first fluidic oscillator 110, the second fluidic oscillator 210, and the third fluidic oscillator 310 oscillate in phase with each other such that the wave form of the exiting fluid streams 199, 299, 399 reach their same respective apices simultaneously.

Figure 9:
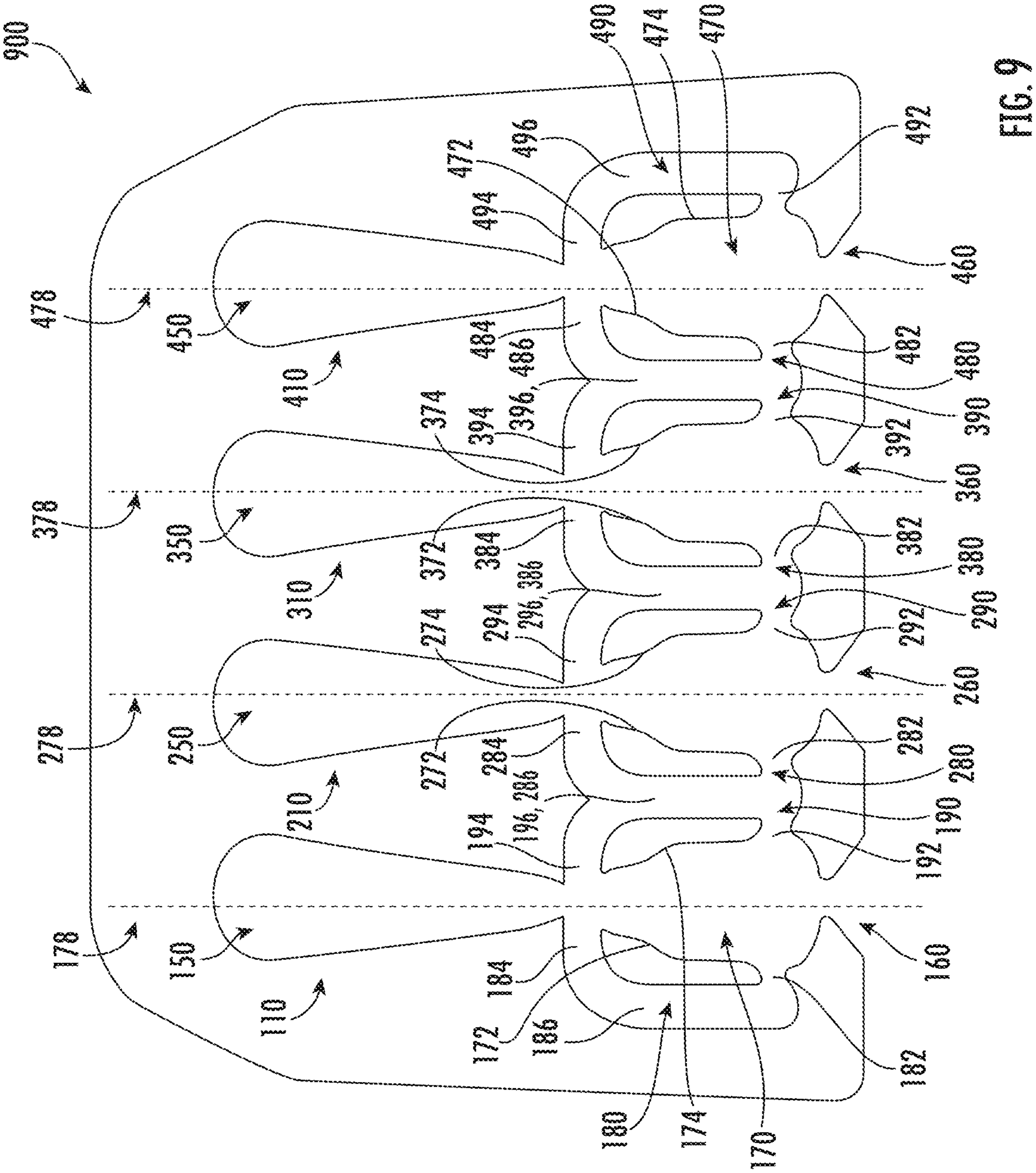
FIG. 9 is a top view of an array of four feedback-type fluidic oscillators, according to another implementation.

FIG. 9 shows another implementation of a fluidic oscillator array 900 including a first fluidic oscillator 110, a second fluidic oscillator 210, and a third fluidic oscillator 310 similar to the fluidic oscillators 110, 210, 310 shown in FIG. 8, but also including a fourth fluidic oscillator 410. Adjacent feedback channels 190, 280, 290, 380, 390, 480 of each adjacent fluidic oscillator 110, 210, 310, 410 in the implementation shown in FIG. 9 share a common intermediate portion 196, 286, 296, 386, 396, 486 such that the adjacent feedback channels 190, 280, 290, 380, 390, 480 are in fluid communication with each other. Thus, the first feedback channel 190 of the first fluidic oscillator 110 shares a common intermediate portion 196, 286 with the second feedback channel 280 of the second fluidic oscillator 210, the first feedback channel 290 of the second fluidic oscillator 210 shares a common intermediate portion 296, 386 with the second feedback channel 380 of the third fluidic oscillator 310, and the first feedback channel 390 of the third fluidic oscillator 310 shares a common intermediate portion 396, 486 with the second feedback channel 480 of the fourth fluidic oscillator 410. Thus, the fluid streams 199, 299, 399, 499 exiting the outlet nozzles 160, 260, 360, 460 of the first fluidic oscillator 110, the second fluidic oscillator 210, the third fluidic oscillator 310, and the fourth fluidic oscillator 410 oscillate in phase with each other such that the wave form of the exiting fluid streams 199, 299, 399, 499 reach their same respective apices simultaneously.

Although the implementation shown in FIG. 9 shows a fluidic oscillator array 900 including four fluidic oscillators 110, 210, 310, 410, in other implementations, a fluidic oscillator array has any number of fluidic oscillators and adjacent feedback channels of each adjacent fluidic oscillator share a common intermediate portion such that the adjacent feedback channels are in fluid communication with each other. Although the implementations shown in FIGS. 2-7 show fluidic oscillators 110, 210 oriented in a variety of ways with respect to each other, in other implementations, a fluidic oscillator array has fluidic oscillators oriented in any combination of the orientations shown in FIGS. 2-7.

The synchronization of the oscillations of two or more fluidic oscillators can be used in flow control applications such as flow over wings and bluff bodies, cooling applications such as turbine blade cooling, and also for spraying applications, mixing purposes, Jacuzzi nozzles, etc. A synchronized fluidic oscillator array is useful in various cooling applications since fluidic oscillators are now being used in such studies and they are proven to be the highly promising cooling device candidate. There are many advantages in many engineering applications of using an array of fluidic oscillator as a system to provide multiple phase synchronized oscillating output fluid streams (also called "jets").

The fluidic oscillator arrays disclosed herein use shared feedback channels between fluidic oscillators that provide the feedback flow to one of the adjacent oscillators and then the other in turn. The small channels over and under the shared feedback channel allow cross oscillator flows and so interaction between to internal jets of the oscillators. This cross-oscillator flow and interaction between oscillators enable the fluidic oscillators to communicate with each other and create phase synchronized output jets.

The relative phase of oscillating jets from a pair of fluidic oscillators is synchronized. According to one implementation, to achieve this synchronization a shared feedback channel between the two oscillators is included. Flow visualization and hot wire measurements indicate a correlation and phase synchronization between the two oscillators. Numerical analysis offers improved understanding of the internal flow physics that leads to the synchronization phenomenon. A portion of the exiting jet from one fluidic oscillator is redirected and crosses over into the adjacent oscillator, leading to momentum transfer between the two oscillators. A portion of this cross-oscillator flow is directed into the shared feedback channel and constitutes the main feedback flow. In this process, one of the shared feedback channel outlets is blocked by a vortex allowing only one oscillator to receive feedback flow. The primary mechanism for phase synchronization is the cross-oscillator flow, which is divided into phase-modulated momentum injection to the primary jet and modulated flow input to the shared channel feedback channel.

One implementation includes a fluidic oscillator pair producing jet oscillations that are in phase. Synchronization is achieved by joining the feedback channels of two adjacent oscillators into a single, common channel. Flow visualization and hot wire anemometry are used to characterize the frequency and relative phase performance, while computational fluid dynamics is used to study the internal flow interactions.

A shared feedback channel to synchronize a fluidic oscillator pair is disclosed, where cross oscillator flow between the fluidic oscillators and this flow provides the synchronization of the phase of the oscillations.

Figure 10:
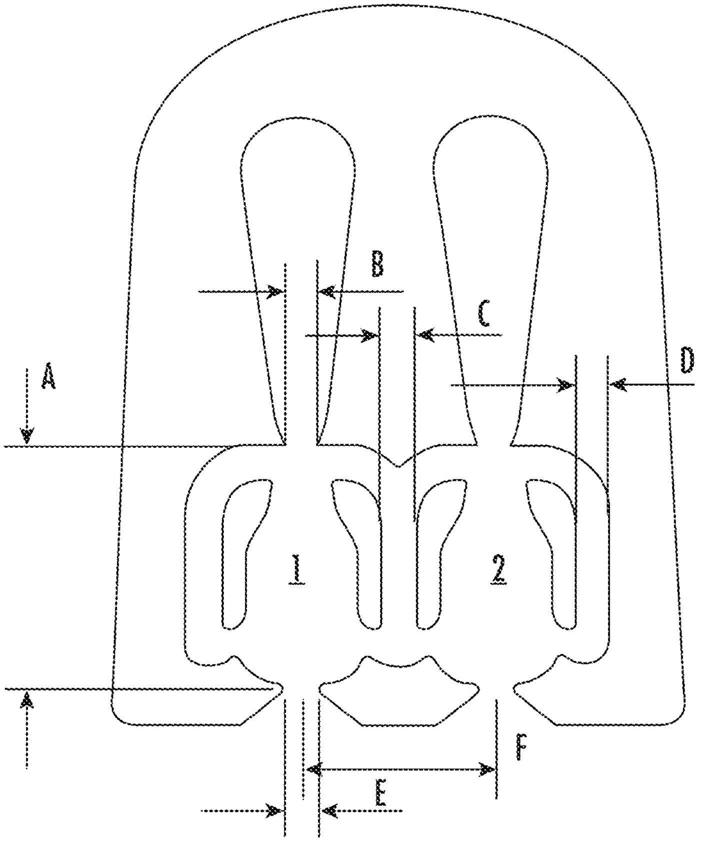
FIG. 10 is a top view of the array of the two feedback-type fluidic oscillators of FIG. 2 with example dimensions.

FIG. 10 shows example dimensions for the implementation shown in FIG. 2. The fluidic oscillator array including a pair of joined fluidic oscillators is made out of acrylic by laser cutting, with a depth (d) of 1.5 mm and a minimum output nozzle width (E) of 3.5 mm (giving a hydraulic diameter of a single oscillator exit of 2.1 mm). The three-piece design consists of a first portion with supply ports, a second portion, and a middle portion having the geometry shown in FIG. 10. The two oscillators forming the pair are overlapped such that one feedback channel is shared between them. The width of the shared feedback channel (4.03 mm) is the same as the width of the unshared feedback channels. In this way, direct interaction between the two oscillators is facilitated by a shared feedback path, opening a flow path between the two oscillators. In order to differentiate between the two oscillators, the first fluidic oscillator on the left in FIG. 10 is numbered as 1 and the second fluidic oscillator on the right is numbered as 2.

Figure 11A:
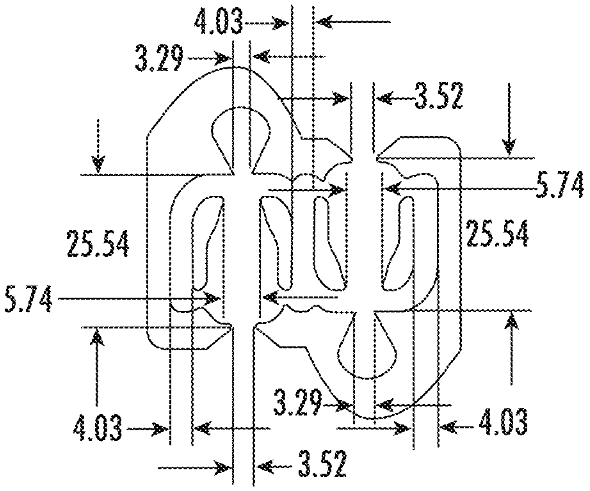
FIGS. 11A and 11B are top views of the arrays of the two feedback-type fluidic oscillators of FIGS. 3 and 4, respectively, with example dimensions.
Figure 11B:
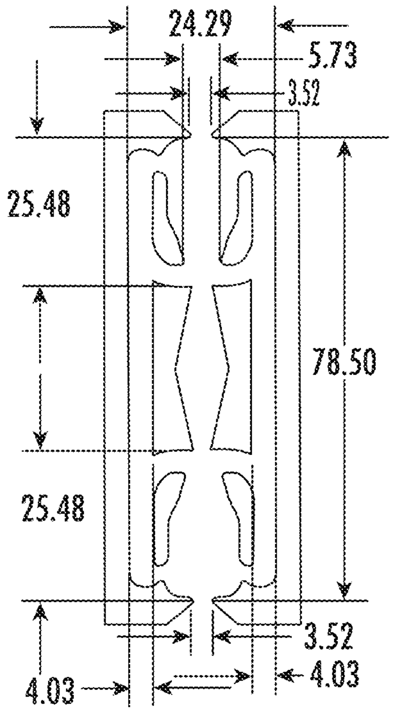

FIGS. 11A and 11B show example dimensions (in millimeters) of the implementations shown in FIGS. 3 and 4, respectively. However, the specific dimensions shown in FIGS. 11A and 11B should not be interpreted as limiting.

EXAMPLES

Visualization of the external flow exiting the oscillators of the fluidic oscillator array shown in FIG. 10 was facilitated by using water instead of air as the working fluid. The higher density of water results in lower oscillation frequency. Also, differences due to surface tension, and the lack of entrainment, may be neglected when assessing flow visualization images with water instead of air. Nevertheless, the overall flow characteristics are similar, since these differences are second-order effects. With the oscillator connected to a water pump (for example, Everbilt SUP80-HD, others also suitable), Omega Engineering FLR1011ST flow meters (for example, others are also suitable) were used to measure the flow rate through each oscillator while the Reynolds number was obtained based on the average velocity calculated at the exit of an oscillator by using the measured volumetric flow rate. The viscosity and the density values of water were updated for each experiment based on the temperature measurements (K-type thermocouple with NI USB-TC01 DAQ device, for example, others also suitable). By using these values, the mass flow rate through the oscillators was also calculated. A Sony DSC-TX30 waterproof digital camera was used to record instantaneous snapshots of the external flow (using the built-in flash), and time-averaged images of the flow were acquired with a long exposure relative to the oscillation period.

Figure 12:
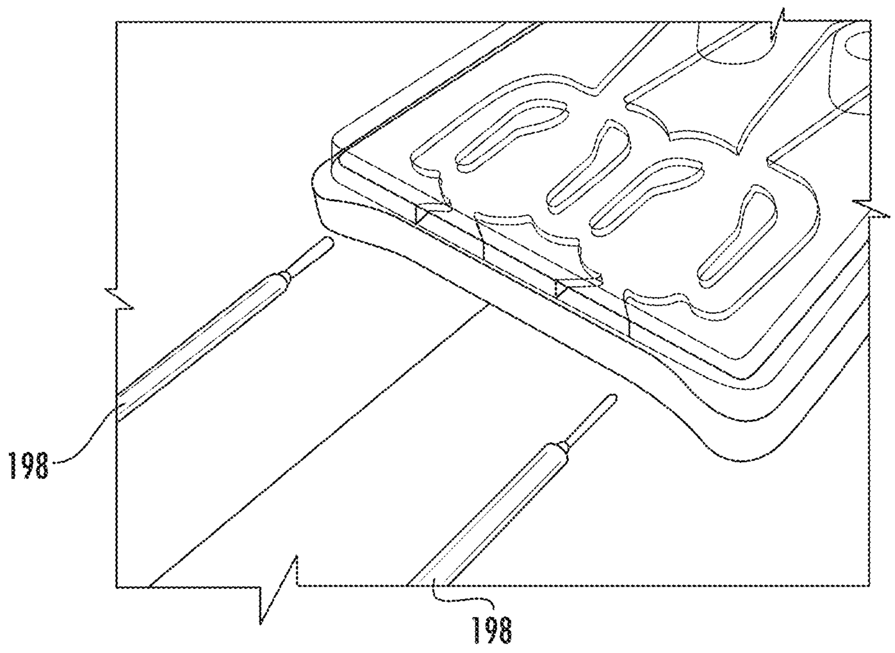
FIG. 12 is a perspective view of the array of the two feedback-type fluidic oscillators of FIG. 2 with hot wire probes located adjacent to the outlet nozzles of the oscillators.

Quantitative measurement of the relative phase between the oscillations of the two jets was done via hot wire anemometry, with the oscillator pair operated using air. The mass flow rate of air through the oscillators, supplied by a shop air system, was set and measured by two Alicat MCR2000 flow mass controllers. Viscosity was calculated by Sutherland's Law while both the viscosity and the density of air were updated by the simultaneous measurement of the temperature with a K-type thermocouple connected to a NI-USB-TC01 thermocouple measurement device. The hot wire measurements were acquired using two channels of a Dantec Dynamics 8-channel Constant Temperature Anemometer (CTA) and digitized at a sampling rate of 20 kHz. Hot wire probes were located perpendicular to the outlet nozzles of the oscillators as shown in FIG. 12. In order to minimize flow interference, the probes were positioned on either side of the outer edges of the oscillation waveform. Each probe was located 6 mm (1.7 E) from the corresponding outlet nozzle centerline and 10 mm (2.86 E) downstream from the oscillator outlet nozzle exit plane. The recorded signals from both probes were simultaneously low-pass filtered at 10 kHz to prevent aliasing. Signal filtering was accomplished by an analog filter (Krohn-Hite 3364) using a 2nd order Butterworth filter.

Computational fluid dynamics (CFD) analysis of the oscillator pair was conducted in order to extract the flow physics of the synchronization phenomenon. The CFD analysis was done in ANSYS CFX, with air (25° C. temperature) as the working fluid, using a flow rate for a single inlet of 20 SLPM (0.39485 g/s). The Reynolds number based on hydraulic diameter and the mean velocity at the oscillator exits was 8500, and the resulting oscillation frequency was 347.22 Hz (T=2.824 ms), compared to the experimental value of 351.66 Hz. Phase delay between exiting jets was calculated to be the same as the experimental value at 2.77°. The total time for the simulation was 0.05 seconds (covering 12.5 periods, allowing start-up transients to settle to periodic oscillations), with 50 micro-second time-steps (~58 time steps per oscillation). The shear stress transport (SST) turbulence model was used while the inlet turbulence intensity was chosen to be 0.5%.

Figure 13:
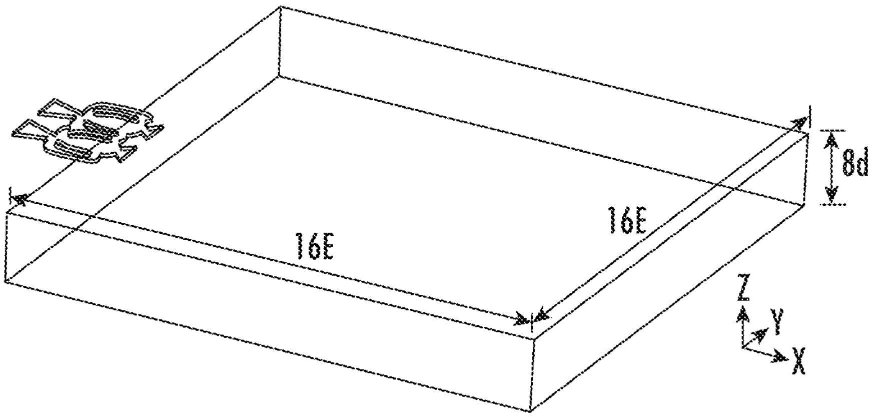
FIG. 13 is a schematic view of the array of the two feedback-type fluidic oscillators of FIG. 2 with a rectangular fluid domain used for numerical analysis.

FIG. 13 shows the rectangular fluid domain used for numerical analysis, with a length and width of 16 E and a depth of 8 d. Since the velocity gradients are more significant along the x and y axes, the height of the fluid domain was kept relatively small. A mass flow rate of 0.39485 g/s for a single inlet was used as the inlet boundary condition while an opening boundary condition was chosen with an opening pressure of 0 Pa. The opening boundary condition is a special type of boundary condition that allows the flow to enter and/or leave the fluid domain (two-way flow), in contrast to the outlet boundary condition that only allows the flow to leave the fluid domain.

Figure 14A:
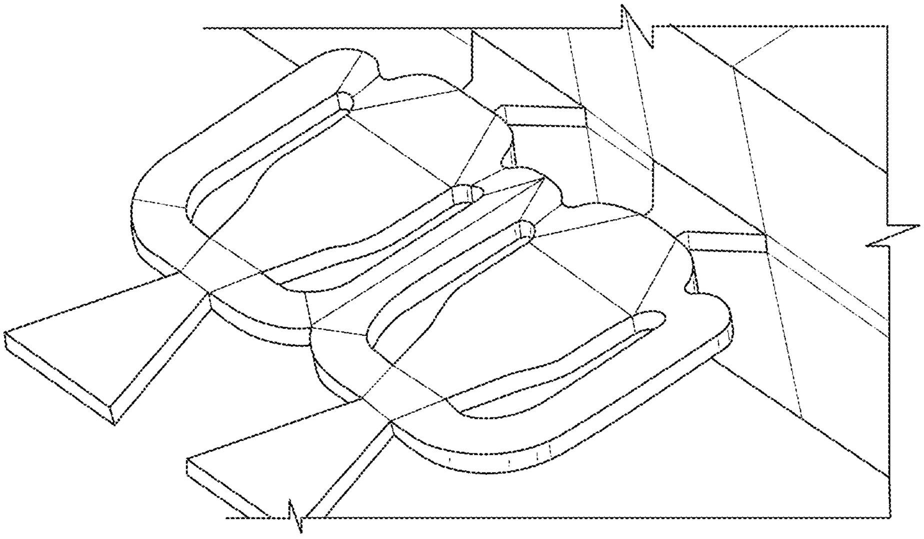
FIG. 14A is a perspective view of a structured mesh generated by using hexahedral elements.
Figure 14B:
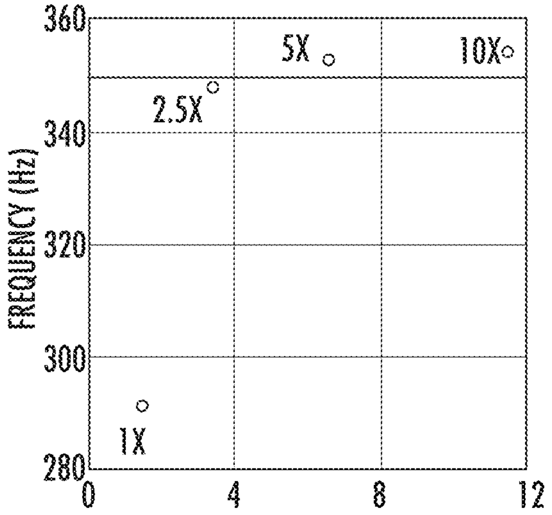
FIG. 14B is a graph showing the frequencies obtained for various meshes.

A structured mesh was generated by using hexahedral elements as some portion of this mesh, as shown in FIG. 14A. In order to assess the grid dependency, various size meshes were generated and numerically solved. FIG. 14B shows the frequencies obtained for various meshes while the solid line represents the experimentally measured frequency. In FIG. 14B, lx corresponds to approximate element number of 140,000. For this size mesh the oscillation frequency was 17% lower than the experimentally measured frequency. As the size of the mesh is increased to 2.5× the calculations yielded an oscillation frequency of 347.22 Hz which was 1.3% lower than the experimental value for that flow rate (351.66 Hz). Further increases in the size of the mesh yielded oscillation frequencies around 354 Hz. In order to decrease the computation load 2.5× mesh size was chosen for numerical calculations. This size mesh consisted of 341,031 hexahedral elements with 304,548 nodes and the y+ value for the fluidic oscillator mesh was approximately 1.

Figure 15C:
FIG. 15C is a top view of a time averaged water flow visualization for the array of the two feedback-type fluidic oscillators of FIG. 2.
Figure 15B:
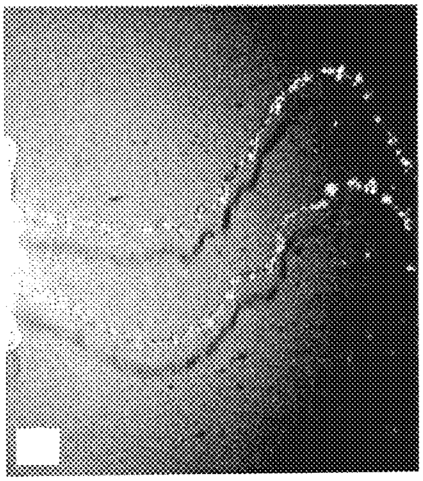
FIGS. 15A-B are top views of water flow visualization for the array of the two feedback-type fluidic oscillators of FIG. 2 at different times.
Figure 15A:
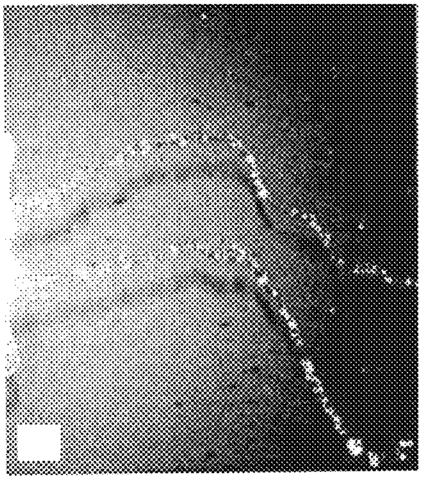

FIGS. 15A-C present water flow visualization images for a single inlet mass flow rate of 19.85 g/s which corresponds to a Reynolds number of 8500, where the Reynolds number is based on hydraulic diameter and the mean velocity at one of the oscillators' exit. The images in FIGS. 15A and 15B are separated by approximately half an oscillation period (0.5 T). While the images are not from within the same oscillation cycle, they are representative of a highly periodic and repeatable flow behavior. The images show that the external jets are oscillating in phase (or nearly so), such that the two jet streams remain parallel far downstream from the exit. This avoidance of mutual jet interference is repeatable at many different randomly selected instances within the oscillation period. Furthermore, FIG. 15C provides the time-averaged flow visualization obtained from the synchronized pair. As can be seen from FIG. 15C, each sweeping jet is tilted slightly away from the centerline of the oscillator pair. This is due to the internal interactions that make synchronization possible and will be discussed below with the internal flow physics.

Figure 16:
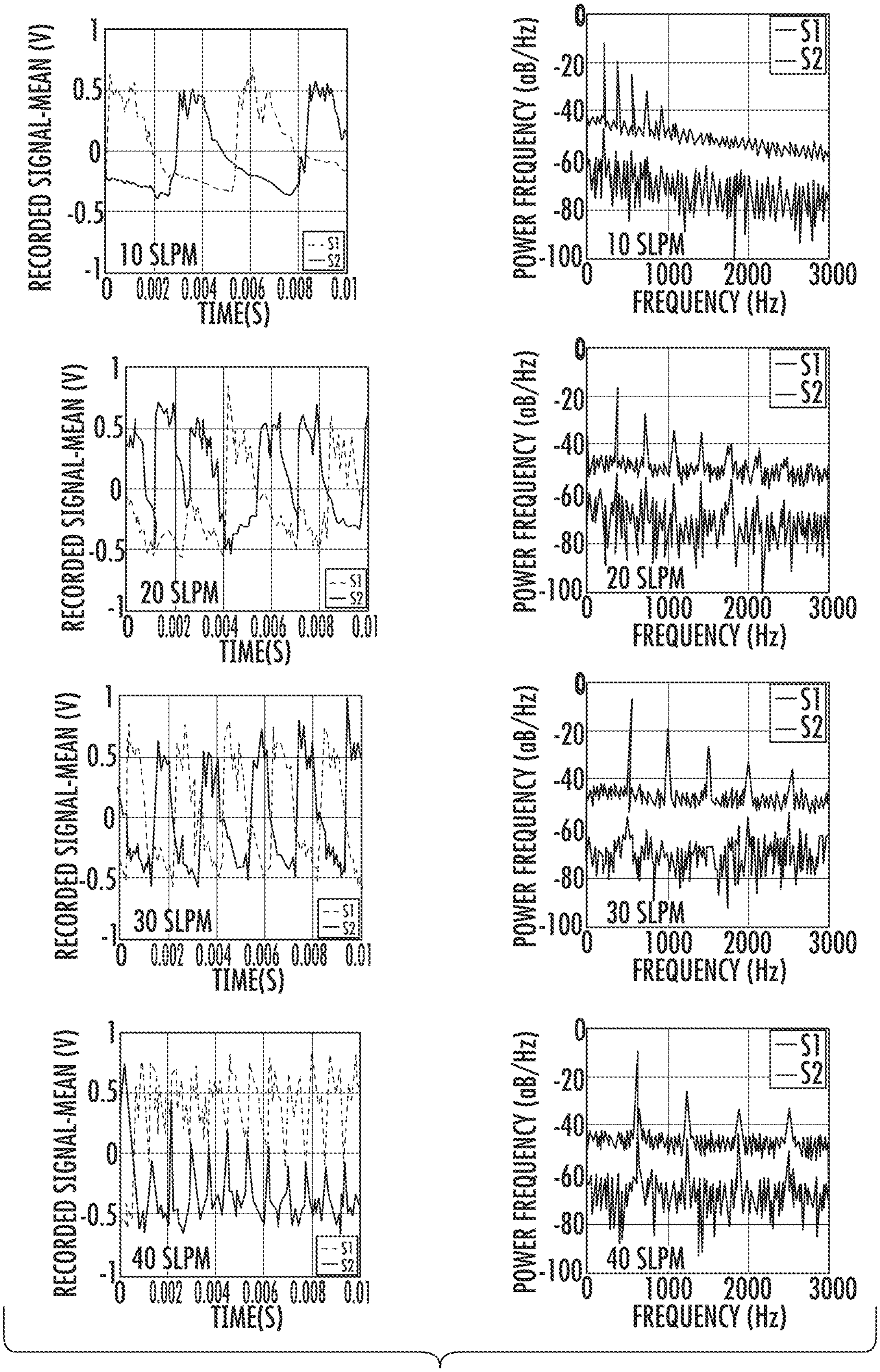
FIG. 16 is a graph of the mean subtracted anti-aliasing filtered raw signals and corresponding power spectra for the array of the two feedback-type fluidic oscillators of FIG. 2.
Figure 17:
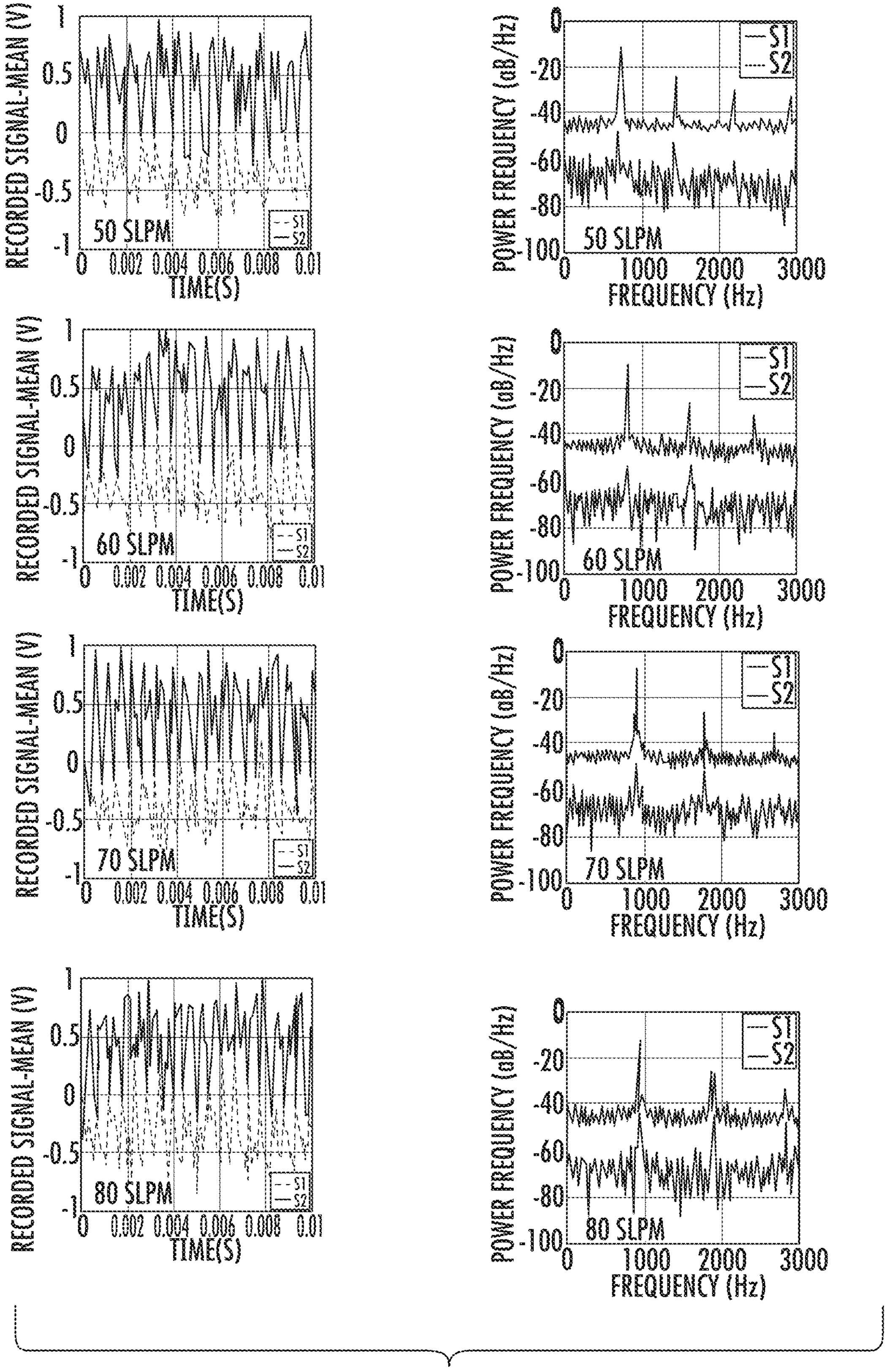
FIG. 17 is a graph of the mean subtracted raw signals and corresponding power spectra for the array of the two feedback-type fluidic oscillators of FIG. 2.

FIG. 16 presents the mean subtracted anti-aliasing filtered raw signals and corresponding power spectra for mass flow rates between 10 SLPM (Re=4250) and 40 SLPM (Re=17,000), while FIG. 17 presents the mean subtracted raw signals and corresponding power spectra for mass flow rates between 50 SLPM (Re=21,250) and 80 SLPM (Re=34,000), all obtained through CTA measurements. Note that quoted mass flow rates are for one side of the oscillator pair, and total supplied mass flow rate for the pair is double the specified values. In FIGS. 16 and 17, S1 corresponds to the signal obtained from oscillator 1 (as shown in FIG. 10) and S2 corresponds to the signal obtained from oscillator 2. All the recorded signals constituting the left columns of FIGS. 16 and 17 are provided for a 0.01 second time interval and the periodicity in both signals for all the flow rates. Furthermore, the increase in frequency is visible as the mass flow rate is increased. No discrepancy was observable in the power spectra between the two oscillators. The oscillation frequency for both oscillators was identical for all flow rates evaluated.

Table 1 provides quantitative insight for the data presented in FIGS. 16 and 17. In Table 1, oscillation frequencies for both oscillators, cross-correlation coefficients for both raw and filtered signals and phase delays are provided for flow rates from 10 SLPM to 80 SLPM. Note that "raw signals" refers to the original signals with 10 kHz anti-alias filtering applied, and "filtered signals" refers to the same raw signals with further low-pass analog filtering applied, with a variable cutoff frequency slightly above the oscillation frequency for a particular flow rate. The measured frequencies were varied from 182.33 Hz to 940.66 Hz for this flow rate range. The oscillation frequencies measured from both oscillators by the two hot wire probes were observed to match perfectly. Cross-correlation coefficients for the raw signals were around −0.7 for all flow rates except for 10 SLPM and over −0.9 for all cases of the filtered signals. This level of correlation indicates a strong relationship between the jet motions of the two oscillators. The negative cross correlation coefficient is due to the fact that the probes were located on opposite sides of the oscillator pair, as shown in FIG. 12, causing the signals to be 180 degrees out of phase. The average phase delay between the two signals (offset by 180 degrees) was the highest for the flow rate of 10 SLPM. The reduced correlation and increased phase delay may be due to relatively lower velocities inside the oscillator, which reduces the amount of momentum transfer for synchronization of the two oscillators. Otherwise, the amount of phase delay between the two oscillator signals remains relatively small, indicating strong synchronization.

TABLE 1

| Mass Flow Rate (SLPM) | Re | Oscillation Frequency (Hz) S1 | S2 | Cross-correlation Coefficient Raw Signal | Filtered Signal | Phase Delay (°) |
|---|---|---|---|---|---|---|
| 10 | 4250 | 182.33 | 182.33 | −0.570 | −0.918 | 10.35 |
| 20 | 8500 | 351.66 | 351.66 | −0.702 | −0.957 | 2.77 |
| 30 | 12750 | 497.66 | 497.66 | −0.721 | −0.950 | 2.65 |
| 40 | 17000 | 623.66 | 623.66 | −0.720 | −0.938 | 1.16 |
| 50 | 21250 | 732.66 | 732.66 | −0.707 | −0.944 | 4.92 |
| 60 | 25500 | 818.33 | 818.33 | −0.701 | −0.932 | 6.73 |
| 70 | 29750 | 885.00 | 885.00 | −0.689 | −0.933 | 4.78 |
| 80 | 34000 | 940.66 | 940.66 | −0.6729 | −0.927 | 1.82 |

Figure 18A:
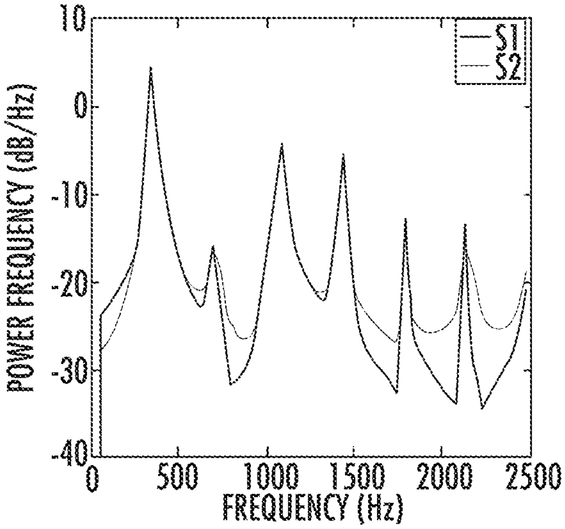
FIGS. 18A and 18B are graphs of the velocity magnitude recorded at the output nozzles of the oscillators of the two feedback-type fluidic oscillators of FIG. 2.
Figure 18B:
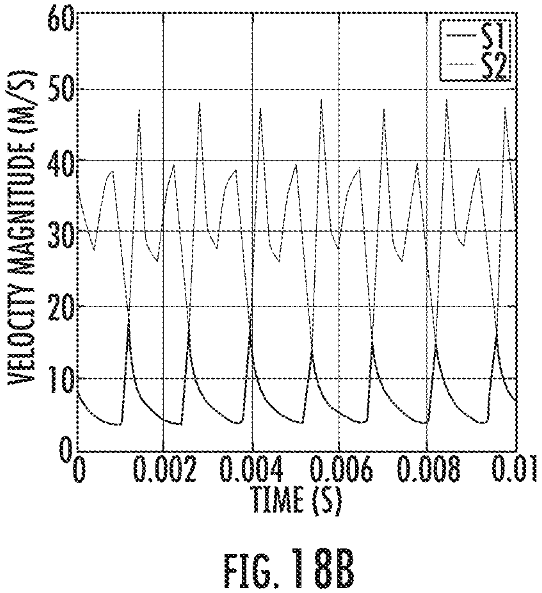

Turning now to computational results, FIGS. 18A and 18B show the history of the velocity magnitude recorded at the exits of the oscillators where the measurement points were selected at the same locations as the hot wire probes. The data presented here is for a mass flow rate of 20 SLPM (Re=8500), with a time interval of 0.01 s that covers approximately 3.55 periods (similar to the experimental values). FIG. 18A is the power spectrum obtained from the velocity magnitude history. As can be seen the frequencies from both oscillators perfectly match for the fundamental frequencies and the following harmonics.

Figure 19A:
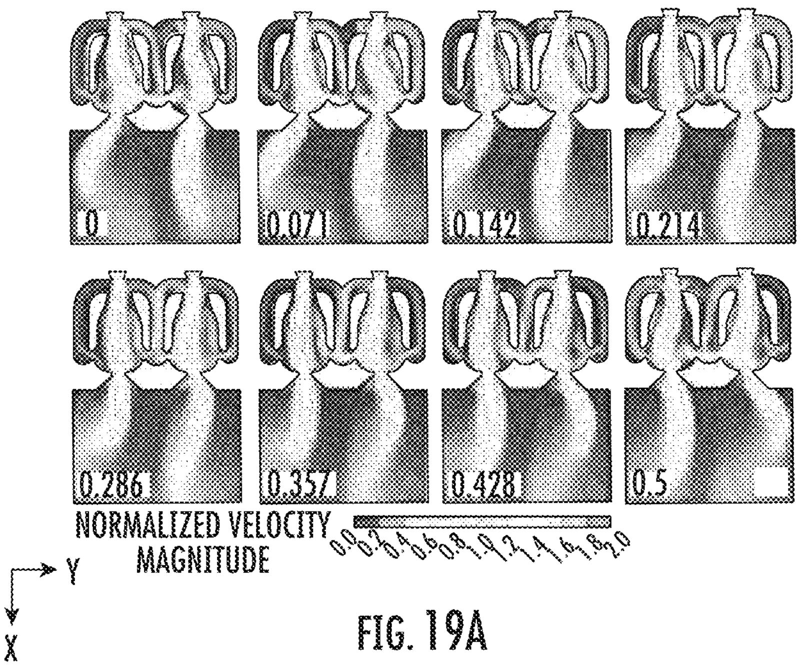
FIGS. 19A and 19B are schematic views of the computationally calculated velocity magnitude contours and streamlines, respectively, for the internal and external flow field of the two feedback-type fluidic oscillators of FIG. 2.
Figure 19B:
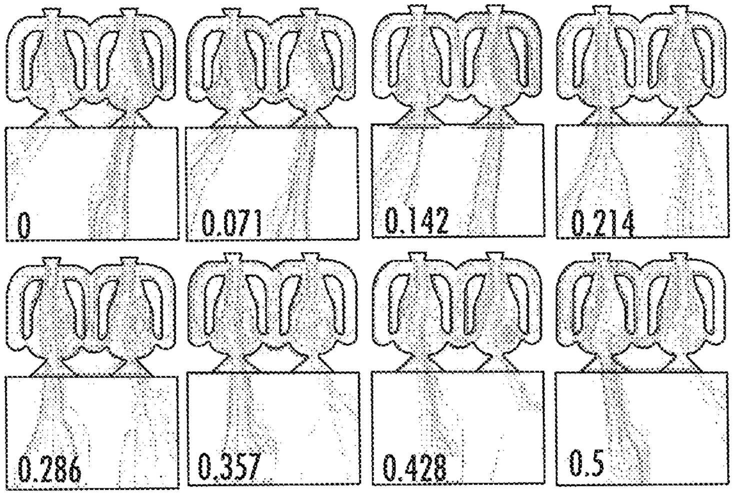

FIGS. 19A and 19B show the computationally calculated velocity magnitude contours (FIG. 19A) and streamlines (FIG. 19B) for the internal and external flow field of the synchronized pair over a half period. In FIGS. 19A and 19B, the velocity magnitudes were normalized by the mean velocity at the exit of a fluidic oscillator, and normalized time ($t^*=t/T$) was defined as a time instant (t) normalized by one period of the oscillation (T). The exiting jets were observed to oscillate in a synchronized manner, with the jets never colliding with one another as was seen in water flow visualizations. The pair of fluidic oscillators appears to oscillate as a unified system, with some interesting cross actuator interactions that are not present in a single fluidic oscillator. First, the oscillation characteristics are not symmetric with respect to the central axis of one of the oscillators. In other words, the behavior of the flow in the oscillator on one side is not the same as the flow characteristics on the other side. The pair of oscillators act as a system are phase linked, rather than as separate oscillators that operate conventionally.

FIG. 19A shows that the velocity magnitude of the exiting jet is not constant, but instead is modulated between high and low velocity output. Also, the magnitude of the jet velocity is out of phase for the two jets. For example, when the right jet is at maximum velocity (for $t^*=0$), the left jet is at minimum velocity magnitude. The flow interactions that allow momentum transfer between jets are shown in the streamline calculations as shown in FIG. 19B. The shared feedback channel enables flow between the two oscillators, with flow from left to right at $t^*=0$ that bypasses the feedback channel almost entirely and strongly affects the jet of the opposing oscillator. However, as the quarter period approaches, the cross-oscillator flow is redirected predominantly into the feedback channel. Also, flow from both oscillators enters the feedback channel, leading to nearly balanced input to the common feedback channel as seen at $t^*=0.286$. As the half period approaches, the direction of the cross-oscillator flow reverses, leading to flow from right to left.

The reason for the velocity modulation at the exit is transfer of momentum between the oscillators via the connected feedback channel. This takes the form of an internal jet from one oscillator to the other, evident at t*=0 (from left to right) and t*=0.5 (from right to left), and emphasized by arrow A shown in FIG. 20. The source of the transverse jet is a portion of momentum from the primary jet, which decreases the velocity of the exiting jet on that side and simultaneously increases the velocity of the opposite jet. The transverse jet occurs due to entrainment from the opposite side cavity, and from impingement of the primary jet on the exit wall which splits a portion of the primary jet into the transverse jet. While this splitting allows momentum transfer between the two oscillators, some portion of this transverse flow also splits again to form the feedback flow in the shared feedback channel between two oscillators (highlighted by arrow B in FIG. 20).

The modulated transverse jets impact the internal flow in several ways. During the initial emergence of the transverse jet into the opposite chamber, the velocity of the transverse jet is low enough that it is directed in the back-flow direction and ultimately entrained into the primary jet on the opposite side. As the momentum of the transverse jet increases, however, it interacts more strongly with the primary jet on the opposite side. This interaction leads to increased deflection of the opposite jet (e.g., t*=0), which also has several consequences. When the primary jet is deflected by the opposing transverse jet to the outside edge of its chamber, a portion of the primary jet is redirected into the outside feedback channel. This feedback flow simultaneously deflects the jet at its origin towards the inside attachment wall, leading to significant internal undulations of the primary jet (e.g., t*=0.071). This same deflection of the primary jet at the origin also causes a small portion of the primary jet shear layer to be redirected into the feedback channel as a small vortex (highlighted by arrow B in FIG. 20). The presence of this small vortex in the feedback channel inhibits interaction of the feedback flow through the common channel, forcing it to interact with the primary jet on the opposite side. Note that, Point 1 and Point 2 in FIG. 20 show the locations where all the point measurements were taken to obtain the velocity history, frequency, etc., throughout a period and these locations are the same locations where the hot wire probes were located.

Figure 20:
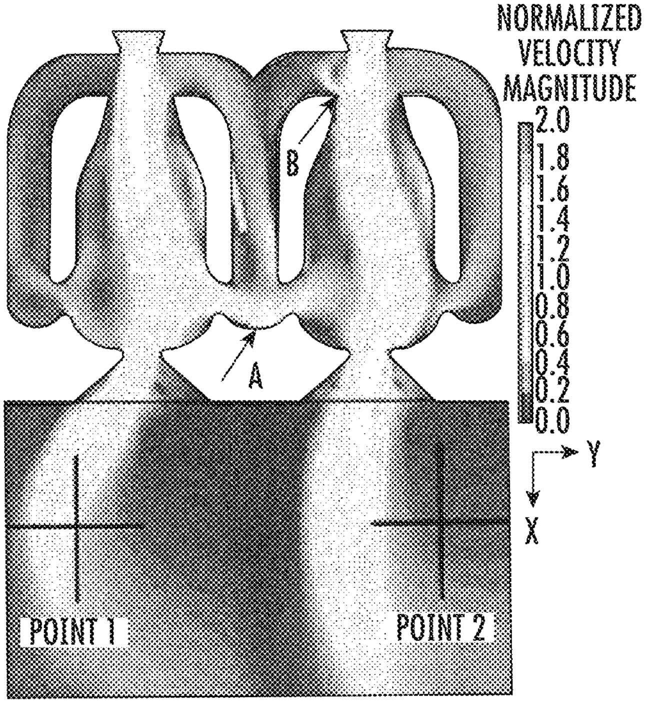
FIG. 20 is a magnified view of the computationally calculated velocity magnitude contour of FIG. 19A.
Figure 21A:
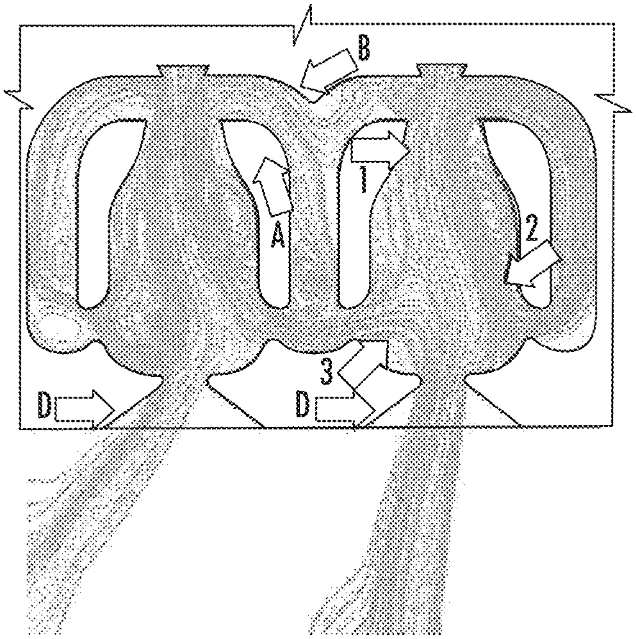
FIGS. 21A and 21B are a schematic views of the flow of fluid through the two feedback-type fluidic oscillators of FIG. 2 showing vortical structures.
Figure 21B:
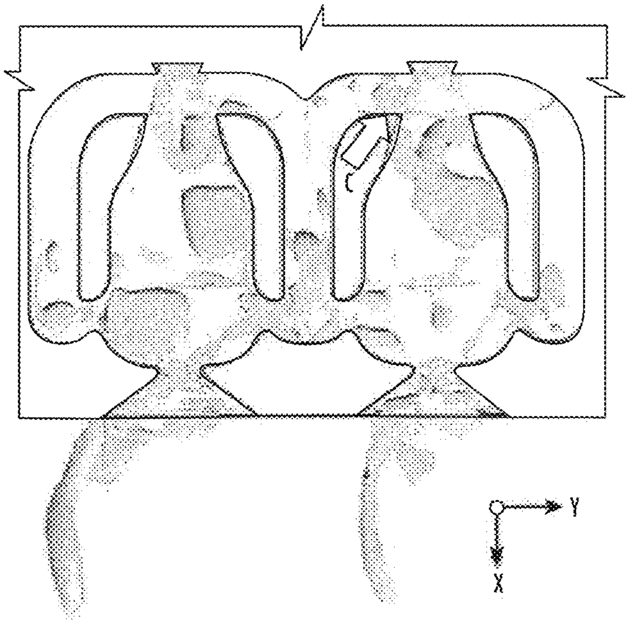

The velocity magnitude contours and streamlines given in FIGS. 19A, 19B, and 20 provide valuable information related to the general characteristics of the flow field of the synchronization mechanism. However, to understand the detailed nature of the flow inside the shared feedback channel and the vortical structures, FIG. 21A depicts the same flow with denser streamline spacing. Furthermore, FIG. 21B depicts iso-surfaces of the Q-criterion to identify the existence of vortical structures. FIG. 21A shows that the feedback flow for oscillator 1 on the left at t*=0 is not only from the primary jet of oscillator 1 (depicted by arrow A), but also from the primary jet of the right oscillator as indicated by arrow B. Therefore, at the end of the middle combined feedback channel (near the first throat) there is weak transverse flow from right to left (in the opposite direction of the primary transverse flow from left to right at the downstream end of the oscillator pair). This transverse flow combines with the feedback channel flow to provide momentum that enlarges the separation bubble and forces the primary jet of the left oscillator to the opposite wall. At the same time, the vortex indicated in FIG. 21B by arrow C blocks the feedback flow for the right oscillator.

Another feature is the lateral meandering of the jet in the right oscillator, as shown by the three numbered arrows in FIG. 21A. Arrow 1 shows the primary jet of the right oscillator attached to the left attachment wall, while arrow 2 indicates that the jet is attached to the right wall further downstream. Arrow 3 shows the transverse flow from the primary jet of the left oscillator that forces the meandering of the main jet in the right oscillator. Momentum transfer not only serves to synchronize the oscillations, but it also forces the attachment behavior of the opposing oscillator such that the oscillations are in phase. This transverse flow (indicated by arrow 3) may be regarded as a second feedback flow that forces the primary jet of the right oscillator. Also, arrows D indicate that the exiting jets do not have equal sweeping angles with respect to exit centerline of each oscillator.

Figure 22A:
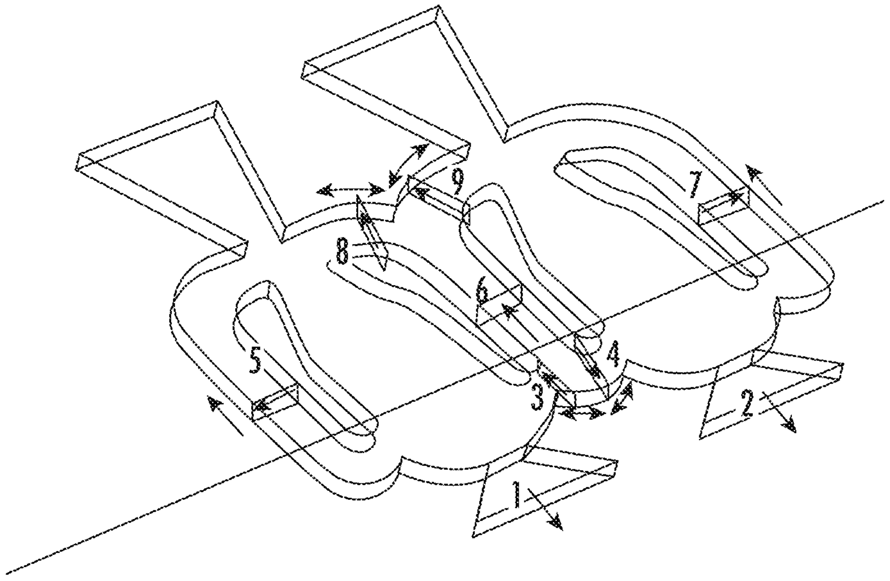
FIGS. 22A and 22B are a schematic view and graph of the average velocity magnitudes calculated for a number of cross-sectional planes.
Figure 22B:
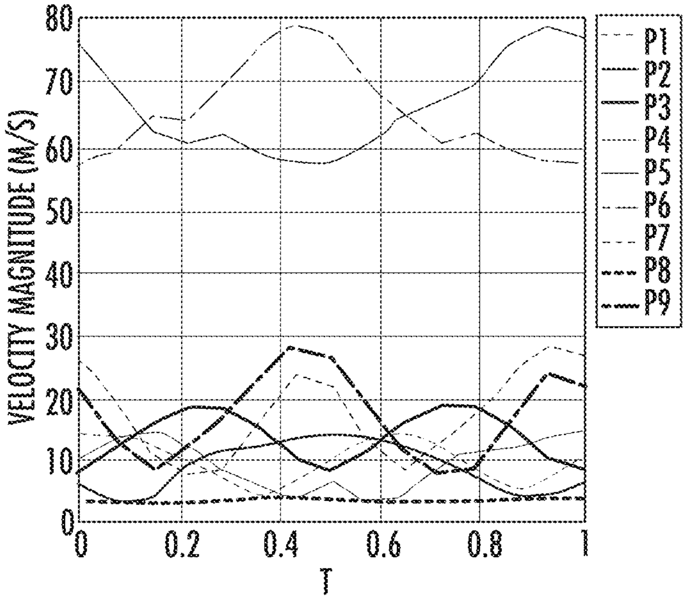

Average velocity magnitudes were calculated for a number of cross-sectional planes, shown in FIG. 22A, in order to quantitatively compare the flows in feedback channels and the throats of the oscillators. In FIG. 22A, unidirectional arrows indicate the presence of flows in a single direction throughout the period, while bidirectional arrows indicate the locations where flow proceeds in both directions throughout the period. FIG. 22B shows the velocity magnitude averaged across each plane. The velocity at each exit plane (P1 and P2) fluctuates, with the velocity magnitude of the two oscillators being out of phase. The difference in velocity between the two exit planes can be as high as 20 m/s (~28% of the cycle-averaged mean velocity magnitude) when the velocity of the left oscillator (P1) reaches a maximum (near t*=0.45). When the exiting jet average velocity is the highest around t*=0.45 for the left oscillator (P1), it is the lowest for the right oscillator (P2). At this very phase, the flow through P4 is the highest and directed toward the left oscillator, while P3 has lower average velocity at that instant due to the split of the transverse jet that flows through P4. The difference in average velocity between P4 and P3 flows through the shared feedback channel through P6 as the feedback flow. The flow through P6 is the feedback flow for P9, which combines with flow through P8 to provide feedback to the right oscillator at a phase of t*=0.45. However, average velocities indicate that the majority of the feedback flow in the shared feedback channel is provided by the flow through P4 rather than the additional feedback flow provided by P8. At the outer feedback channels, the feedback flow for the left oscillator at P5 increases while the feedback flow for the right oscillator at P7 decreases.

Figure 23:
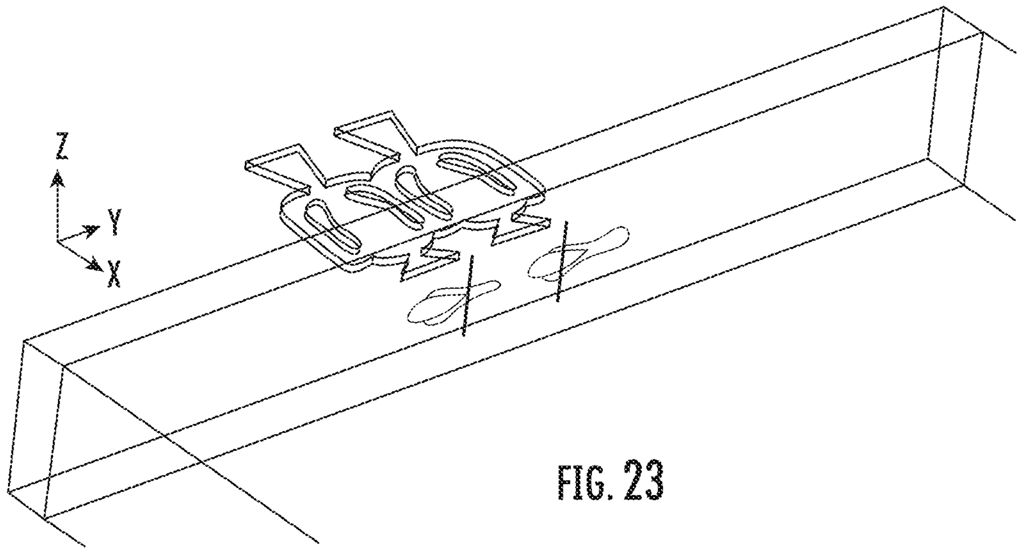
FIG. 23 is a schematic view of the two feedback-type fluidic oscillators of FIG. 2 with a transparent plane for measuring the velocity magnitude contours of the exiting fluid streams.
Figure 24A:
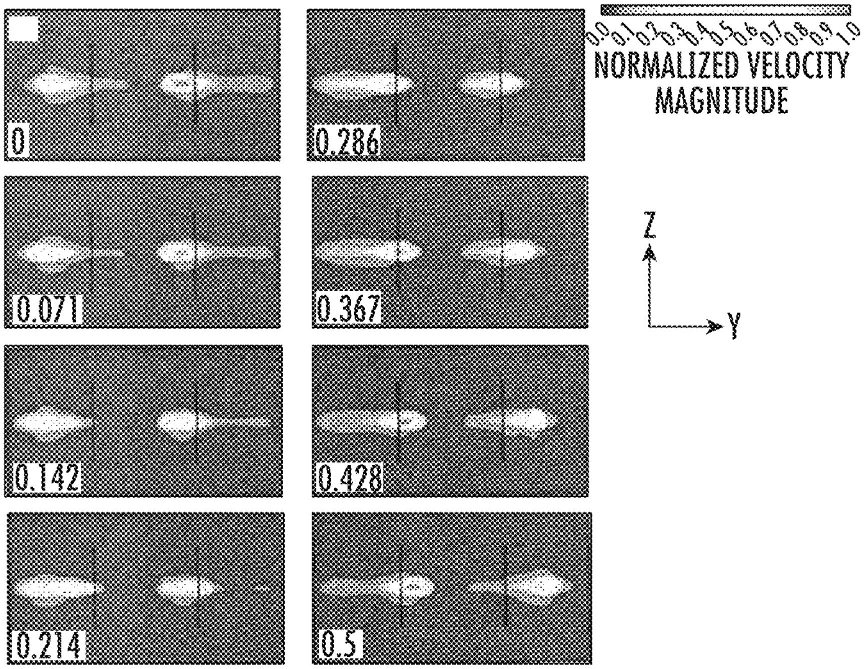
FIG. 24A is a schematic view of the velocity magnitude contours of the exiting fluid streams of FIG. 23.
Figure 24B:
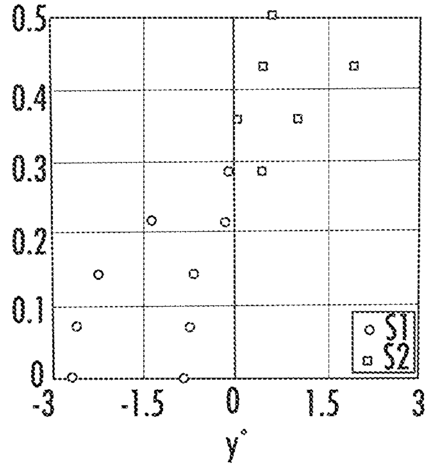
FIG. 24B is a graph of the velocity magnitude at different times.

A difference in the amount of sweep of the exiting jets from each oscillator was indicated with arrows D in FIG. 21A, which will be discussed below. FIG. 23 shows a transparent plane where the velocity magnitude contours of the exiting jets were drawn along with the two solid lines that show the respective centerline of the exit of each oscillator, which is shown in FIG. 24A. The locations of highest velocity magnitude within these contours were determined and tracked to compare the sweeping angles of the exiting jets as shown in FIG. 24B. For instance, at t*=0 the exiting jet of the left oscillator (S1) is 2.6 E from its centerline while the exiting jet of the right oscillator (S2) jet is only 0.86 E from its centerline. This corresponds to s sweeping angle of 36.8° for the left oscillator at this instant, and 14° for the right oscillator. Therefore, the total sweeping angle of an oscillator will be 50.8°, but vectored away from the centerline of the oscillator pair. Furthermore, the contours shown in FIG. 24A also confirm the fact that the velocity magnitudes of the exiting jets are not constant and continuously change depending on the phase of the oscillation.

The synchronization characteristics and internal flow interactions across the oscillators for a synchronized pair of oscillator is disclosed. Flow visualizations of the external flow show a highly periodic and repeatable behavior. Mutual jet interference was avoided, and the two jet streams were observed to remain parallel far downstream from the exits of the oscillators. The sweeping of the exiting jets appeared skewed or vectored away from the shared centerline of the oscillator pair. Hot wire measurements confirmed the synchronized motion of the exiting jets of the oscillators and showed that the synchronized oscillator system is stable for a wide range of Reynolds numbers (4250 to 34,000).

The internal flow interactions are influenced by periodic momentum transfer between the oscillators due to internal cross flow across the shared feedback channel. The momentum for this transverse jet was supplied by a portion of the exiting jet from one of the oscillators. The transverse jet not only provides the feedback flow that synchronizes the oscillations, but it also influences the trajectory and attachment characteristics of the opposing main jet such that oscillations are maintained in phase. In addition to the momentum transfer, a small vortex periodically forms at the base of the shared feedback channel, due to a small portion of the primary jet being redirected by the presence of the attachment wall. This small vortex ensures that feedback flow is directed to the opposite side. The majority of the feedback flow in the shared feedback channel was found to be from a portion of the transverse jet. The sweeping angle of the exiting jets was not symmetric across the oscillator centerline, with the mean jet direction skewed towards the outer edges of the oscillator pair.

A number of implementations have been described. Nevertheless, it will be understood that various modifications may be made without departing from the spirit and scope of the claims. Accordingly, other implementations are within the scope of the following claims.

Certain terminology is used herein for convenience only and is not to be taken as a limitation on the present claims. In the drawings, the same reference numbers are employed for designating the same elements throughout the several figures. A number of examples are provided, nevertheless, it will be understood that various modifications can be made without departing from the spirit and scope of the disclosure herein. As used in the specification, and in the appended claims, the singular forms “a,” “an,” “the” include plural referents unless the context clearly dictates otherwise. The term “comprising” and variations thereof as used herein is used synonymously with the term “including” and variations thereof and are open, non-limiting terms. Although the terms “comprising” and “including” have been used herein to describe various implementations, the terms “consisting essentially of” and “consisting of” can be used in place of “comprising” and “including” to provide for more specific implementations and are also disclosed.

What is claimed is:

1. A fluidic oscillator array comprising:

at least two fluidic oscillators, each of the at least two fluidic oscillators comprising:

a first portion, a second portion, and a middle portion disposed between the first portion and the second portion, wherein the middle portion comprises:

an interaction chamber having a first attachment wall and a second attachment wall opposite and spaced apart from the first attachment wall, a fluid supply inlet for introducing a fluid stream into the interaction chamber, a single outlet nozzle downstream of the fluid supply inlet, wherein the fluid stream exits the interaction chamber through the single outlet nozzle, and a feedback channel coupled to each of the first attachment wall and second attachment wall and in fluid communication with the interaction chamber, each feedback channel having a first end, a second end opposite and spaced apart from the first end, and an intermediate portion disposed between the first end and second end, wherein the first end is adjacent the single outlet nozzle and the second end is adjacent the fluid supply inlet, wherein the first attachment wall and second attachment wall of the interaction chamber are shaped to allow fluid from the fluid stream to flow into the first ends of the respective feedback channels, causing the fluid stream to oscillate between the first attachment wall and second attachment wall of the interaction chamber;

wherein each of the at least two fluidic oscillators includes an interaction chamber plane extending between the first attachment wall and the second attachment wall of the at least two fluidic oscillators, wherein the first portion of each fluidic oscillator is disposed on an opposite side of the interaction chamber plane of the respective fluidic oscillator from the second portion of the respective fluidic oscillator, wherein the interaction chamber plane of the at least two of the fluidic oscillators are parallel with each other such that the first portion of at least one of the fluidic oscillators is disposed adjacent the second portion of at least one other fluidic oscillator, and wherein adjacent feedback channels of adjacent fluidic oscillators share a common intermediate portion such that the adjacent feedback channels are in fluid communication with each other, causing the fluid streams exiting the single outlet nozzle of each of the at least two fluidic oscillators to sweep such that the exiting fluid streams oscillate at the same frequency.

2. The fluidic oscillator array of claim 1, wherein fluid from the fluid stream of one fluidic oscillator flows from the first end of one of the feedback channels of the one fluidic oscillator and through the first end of one of the feedback channels of an adjacent fluidic oscillator.

3. The fluidic oscillator array of claim 1, wherein the fluid streams exiting the single outlet nozzles of the at least two fluidic oscillators oscillate in phase with each other.

4. The fluidic oscillator array of claim 1, wherein the fluid streams exiting the single outlet nozzles of the at least two fluidic oscillators oscillate with a 180 degree phase difference.

5. The fluidic oscillator array of claim 1, wherein adjacent fluidic oscillators share common intermediate portions of two feedback channels such that the two feedback channels are in fluid communication with each other.

6. The fluidic oscillator array of claim 1, further comprising a central axis extending from the fluid supply inlet to the single outlet nozzle of the at least two fluidic oscillators, wherein the central axes of the at least two fluidic oscillators are parallel to each other.

7. A fluidic oscillator array comprising:

a first fluidic oscillator and a second fluidic oscillator, each of the first fluidic oscillator and second fluidic oscillator comprising:

an interaction chamber having a first attachment wall and a second attachment wall opposite and spaced apart from the first attachment wall, a fluid supply inlet for introducing a fluid stream into the interaction chamber, a single outlet nozzle downstream of the fluid supply inlet, wherein the fluid stream exits the interaction chamber through the single outlet nozzle, and a first feedback channel coupled to the first attachment wall and a second feedback channel coupled to the second attachment wall, the first feedback channel and second feedback channel being in fluid communication with the interaction chamber, each of the first feedback channel and second feedback channel having a first end, a second end opposite and spaced apart from the first end, and an intermediate portion disposed between the first end and second end, wherein the first end is adjacent the single outlet nozzle and the second end is adjacent the fluid supply inlet, wherein the first attachment wall and second attachment wall of the interaction chamber are shaped to allow fluid from the fluid stream to flow into the first ends of the first feedback channel and second feedback channel, respectively, causing the fluid stream to oscillate between the first attachment wall and second attachment wall of the interaction chamber;

wherein the first fluidic oscillator is disposed relative to the second fluidic oscillator such that the first feedback channel of the first fluidic oscillator is closer to the second feedback channel of the second fluidic oscillator than to the first feedback channel of the second fluidic oscillator, and wherein the first feedback channel of the first fluidic oscillator and the second feedback channel of the second fluidic oscillator share a common intermediate portion such that the adjacent feedback channels are in fluid communication with each other, causing the fluid streams exiting the single outlet nozzle of the first fluidic oscillator and second fluidic oscillator to sweep such that the exiting fluid streams oscillate at the same frequency.

8. The fluidic oscillator array of claim 7, wherein fluid from the fluid stream of the first fluidic oscillator flows from the first end of the first feedback channel of the first fluidic oscillator and through the first end of the second feedback channel of the second fluidic oscillator.

9. The fluidic oscillator array of claim 7, wherein the fluid streams exiting the single outlet nozzles of the first fluidic oscillator and the second fluidic oscillator oscillate in phase with each other.

10. The fluidic oscillator array of claim 7, wherein the fluid streams exiting the single outlet nozzles of the first fluidic oscillator and the second fluidic oscillator oscillate with a 180 degree phase difference.

11. The fluidic oscillator array of claim 7, wherein the second feedback channel of the first fluidic oscillator and the first feedback channel of the second fluidic oscillator share a common intermediate portion such that the second feedback channel of the first fluidic oscillator and the first feedback channel of the second fluidic oscillator are in fluid communication with each other.

12. The fluidic oscillator array of claim 7, further comprising a central axis extending from the fluid supply inlet to the single outlet nozzle of both the first fluidic oscillator and the second fluidic oscillator, wherein the central axis of the first fluidic oscillator and the central axis of the second fluidic oscillator are parallel to each other.

13. The fluidic oscillator array of claim 7, further comprising a central axis extending from the fluid supply inlet to the single outlet nozzle of both the first fluidic oscillator and the second fluidic oscillator, wherein the central axis of the first fluidic oscillator and the central axis of the second fluidic oscillator are coincident with each other.

14. The fluidic oscillator array of claim 7, further comprising a central axis extending from the fluid supply inlet to the single outlet nozzle of both the first fluidic oscillator and the second fluidic oscillator, wherein the central axis of the first fluidic oscillator and the central axis of the second fluidic oscillator are perpendicular to each other.

15. The fluidic oscillator array of claim 7, further comprising an interaction chamber plane extending between the first attachment wall and the second attachment wall of both the first fluidic oscillator and the second fluidic oscillator, wherein the interaction chamber plane of the first fluidic oscillator and the interaction chamber plane of the second fluidic oscillator are parallel with each other.

16. The fluidic oscillator array of claim 7, further comprising an interaction chamber plane extending between the first attachment wall and the second attachment wall of both the first fluidic oscillator and the second fluidic oscillator, wherein the interaction chamber plane of the first fluidic oscillator and the interaction chamber plane of the second fluidic oscillator are perpendicular to each other.

* * * * *